US011185076B2

(12) United States Patent
Hagiwara et al.

(10) Patent No.: US 11,185,076 B2
(45) Date of Patent: Nov. 30, 2021

(54) COMPOSITION FOR CONTROLLING PLANT DISEASES AND METHOD FOR CONTROLLING PLANT DISEASES APPLYING THE SAME

(71) Applicant: MITSUI CHEMICALS AGRO, INC., Tokyo (JP)

(72) Inventors: Hiroyuki Hagiwara, Mobara (JP); Natsuko Araki, Chiba (JP); Mikio Tsuda, Yokohama (JP)

(73) Assignee: MITSUI CHEMICALS AGRO, INC., Chuo-ku (JP)

( * ) Notice: Subject to any disclaimer, the term of this patent is extended or adjusted under 35 U.S.C. 154(b) by 77 days.

(21) Appl. No.: 16/488,444

(22) PCT Filed: Feb. 27, 2018

(86) PCT No.: PCT/JP2018/007253
§ 371 (c)(1),
(2) Date: Aug. 23, 2019

(87) PCT Pub. No.: WO2018/159609
PCT Pub. Date: Sep. 7, 2018

(65) Prior Publication Data
US 2020/0000094 A1    Jan. 2, 2020

(30) Foreign Application Priority Data

Feb. 28, 2017  (JP) .............................. JP2017-036468

(51) Int. Cl.
| A01N 43/90 | (2006.01) |
| A01N 43/12 | (2006.01) |
| A01N 47/12 | (2006.01) |

(52) U.S. Cl.
CPC ............. *A01N 43/90* (2013.01); *A01N 43/12* (2013.01); *A01N 47/12* (2013.01)

(58) Field of Classification Search
CPC ......... A01N 43/90; A01N 43/12; A01N 47/12
See application file for complete search history.

(56) References Cited

U.S. PATENT DOCUMENTS

| 3,663,704 | A | 5/1972 | Aoki et al. |
| 3,917,838 | A | 11/1975 | Bass et al. |
| 4,008,325 | A | 2/1977 | Bass et al. |
| 4,064,261 | A | 12/1977 | Paget |
| 4,550,165 | A | 10/1985 | Martin |
| 4,595,755 | A | 6/1986 | Martin |
| 6,410,574 | B2 | 6/2002 | Nishiguchi et al. |
| 8,097,631 | B2 | 1/2012 | Stock et al. |
| 8,101,657 | B2 | 1/2012 | Yamada et al. |
| 8,940,717 | B2 | 1/2015 | Kiguchi et al. |
| 9,288,986 | B2 | 3/2016 | Tamagawa et al. |
| 9,901,097 | B2 | 2/2018 | Kuwahara |
| 10,091,996 | B2 | 10/2018 | Tamagawa et al. |
| 10,463,043 | B2 | 11/2019 | Nishimura et al. |
| 2007/0049635 | A1 | 3/2007 | Ebihara et al. |
| 2007/0149401 | A1 | 6/2007 | Haskell et al. |
| 2008/0221110 | A1 | 9/2008 | Cailleau et al. |
| 2008/0280892 | A1 | 11/2008 | Cailleau et al. |
| 2009/0023667 | A1 | 1/2009 | Tomura et al. |
| 2009/0320166 | A1 | 12/2009 | Suty-Heinze et al. |
| 2019/0014782 | A1 | 1/2019 | Tamagawa et al. |

FOREIGN PATENT DOCUMENTS

| CA | 1022458 A | 12/1977 |
| DE | 1903169 A | 7/1970 |
| EA | 023372 B1 | 5/2016 |
| EP | 1 872 658 A1 | 1/2008 |
| GB | 1394373 A | 5/1975 |
| JP | S48061499 A | 8/1973 |
| JP | S54117028 A | 9/1979 |
| JP | 2000109404 A | 4/2000 |
| JP | 2003528118 A | 9/2003 |
| JP | 2008024682 A | 2/2008 |
| JP | 2016-79185 A | 5/2016 |
| KR | 10-2009-0024813 A | 3/2009 |
| KR | 10-2013-0018662 A | 2/2013 |
| RU | 2165144 C1 | 4/2001 |
| RU | 2008129378 A | 1/2010 |
| RU | 2403714 C2 | 11/2010 |
| RU | 2418413 C2 | 5/2011 |
| RU | 2512302 C2 | 4/2014 |
| WO | 2005042474 A1 | 5/2005 |
| WO | 2006106811 A1 | 10/2006 |
| WO | 2008075453 A1 | 6/2008 |
| WO | WO 2014/066120 A1 * | 5/2014 |
| WO | 2015/049168 A1 | 4/2015 |
| WO | 2017/061483 A1 | 4/2017 |

OTHER PUBLICATIONS

Office Action dated Jan. 16, 2020, by the Russian Patent Office in corresponding Russian Patent Application No. 2019130322 and an English translation of the Office Action. (19 pages).

Chida, et al., Effect of Fthalide on Infection Process of Pyricularia oryzae with Special Observation of Penetration Site of Appressoria, Japanese Journal of Phytopathology, 1982, vol. 48(1), pp. 58-63 (w/ English Abstract).

Chrysayi, et al., "Effect of Tricyclazole on Growth and Secondary Metabolism in Pyricularia oryzae", Pesticide Biochemistry and Physiology, 1978, vol. 8(1), pp. 26-32.

FRAC Code List 2016: Fungicides sorted by mode of action (including FRAC Code numbering), FRAC (Fungicide Resistance Action Committee, pp. 1-10.

International Search Report (PCT/ISA/210) and translation and Written Opinion (PCT/ISA/237) dated May 29, 2018, by the Japanese Patent Office as the International Searching Authority for International Application No. PCT/JP2018/007253.

(Continued)

*Primary Examiner* — Shawquia Jackson
(74) *Attorney, Agent, or Firm* — Buchanan Ingersoll & Rooney PC

(57) ABSTRACT

A composition for controlling plant diseases of the present invention includes at least one selected from the group consisting of tolprocarb, pyroquilon, tricyclazole, fthalide and salts thereof as an active ingredient. The composition is used for at least one plant disease selected from the group consisting of fungal diseases other than rice blast, bacterial diseases other than bacterial grain rot of rice, and viral diseases.

18 Claims, No Drawings

(56) References Cited

OTHER PUBLICATIONS

Kurahashi, et al., "Melanin Biosynthesis Inhibitors (MBIs) for Control of Rice Blast", Pesticide Outlook, Feb. 2001, vol. 12, pp. 32-35.
Plonka, et al., "Melanin synthesis in microorganisms—biotechnological and medical aspects", Acta Biochemica Polonica, 2006, vol. 53, No. 3, pp. 429-443.
Partial Supplementary European Search Report dated Oct. 21, 2020, by the European Patent Office in corresponding European Patent Application No. 18761544.8. (13 pages).
Office Action dated Oct. 27, 2020, by the Intellectual Property Office of the People's Republic of China in corresponding Chinese Patent Application No. 201880013220.4, and a partial English of the Office Action. (8 pages).
Office Action dated Nov. 26, 2020, by the Korean Patent Office in corresponding Korean Patent Application No. 10-2019-7024466. (13 pages).
Hagiwara et al., "Development of a novel fungicide, tolprocarb," Journal of Pesticide Science, 2019, vol. 44, No. 3, pp. 208-213.
Xiao, "Torprocarb: a novel carbamate fungicide," World Pesticides, Shinohara, Aug. 25, 2015, vol. 37, No. 4, 61-62.

\* cited by examiner

COMPOSITION FOR CONTROLLING PLANT DISEASES AND METHOD FOR CONTROLLING PLANT DISEASES APPLYING THE SAME

TECHNICAL FIELD

The present invention relates to a composition for controlling plant diseases for controlling predetermined plant diseases and a method for controlling plant diseases applying the same.

BACKGROUND ART

From the past, a large number of chemical agents have been used for controlling plant diseases. However, in order to control the same kind of plant diseases, chemical agents having a similar skeleton and performing the similar mode of action are frequently used or overdosed, or the like, such that the problem of resistance of plant pathogens against the chemical agents is becoming remarkable.

On the other hand, the needs of consumers for crops with reduced agricultural chemicals or the social needs for reducing an environmental load caused by agricultural chemicals are increasing in recent years.

A melanin biosynthesis inhibitor (hereinafter abbreviated as "MBI agent") is a fungicide that inhibits a melanin biosynthesis in fungi. It is known that in rice blast (*Pyricularia oryzae*) or cucurbit anthracnose (*Colletotrichum lagenarium*) which are diseases caused by fungi, melanization of appressorium is essential for invasion into plants (Non-Patent document 1) and an MBI agent inhibits melanization of appressorium to inhibit invasion into plants and as the result to exhibit a control effect (Non-Patent Document 2). On the other hand, it is considered that except for the rice blast or the cucurbit anthracnose, the MBI agent does not exhibit the control effect of plant diseases such as other fungi not requiring melanization of appressorium for invasion into plants and bacteria or viruses without a melanin biosynthesis.

Tolprocarb, pyroquilon, tricyclazole, fthalide, carpropamid, diclocymet and fenoxanil are known as the MBI agent and they have been used as a control agent for the rice blast. These compounds of the MBI agents are classified into three types according to a type of enzyme relating to the melanin biosynthesis that the compounds respectively inhibit. In an FRAC code list, tolprocarb inhibits a polyketide synthase in melanin biosynthesis, pyroquilon, tricyclazole and fthalide inhibit reductase in melanin biosynthesis, and carpropamid, diclocymet and fenoxanil inhibit dehydratase in melanin biosynthesis, so each of them is classified into MBI-polyketide synthase (MBI-P), MBI-reductase (MBI-R) and MBI-dehydratase (MBI-D) (Non-Patent Document 3).

It has been found that tolprocarb of the present invention, which is a diamine derivative exhibiting a control effect on a plant disease, particularly has a high control effect on the rice blast (*Pyricularia oryzae*) which are diseases caused by the fungi (Patent Document 1). In addition, it discloses a composition for controlling a harmful organism, which contains diamine derivatives including tolprocarb and one or more compounds selected from the group consisting of other fungicides, insecticides, and miticides, and a method for controlling a pest using the same (Patent Document 2). In addition, it discloses a composition for controlling harmful organism, which contains a compound represented by the general formula (1) and a compound represented by a general formula (DD) containing known tolprocarb (Patent Document 3).

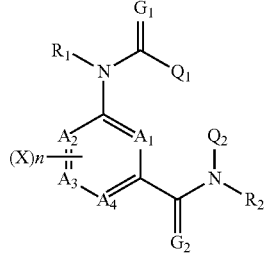

(1)

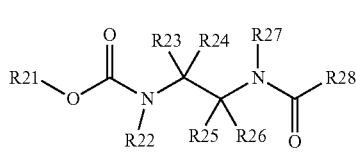

(DD)

However, a formulation, which contains tolprocarb as the only active ingredient for controlling the rice blast, is registered as agricultural chemicals for the rice blast caused by the fungi and for the bacterial grain rot of rice (*Burkholderia glumae*) caused by bacteria. However, it does not disclose that the formulation exhibits a control effect on other plant diseases than those above.

It discloses that the known pyroquilon used in the present invention exhibits the control effect on the rice blast (Patent Document 4). In addition, it discloses a producing method thereof (Patent Document 5). In addition, it discloses that pyroquilon-based compounds, which contain no pyroquilon itself and are its analogous compounds, have antibacterial activity against gram-negative bacteria such as *Staphylococcus aureus* and *Pseudomonas aeruginosa* (Patent Document 6). However, none of the analogous compounds of the pyroquilon listed in Patent Document 6 has antibacterial activity against bacteria causing diseases in plants. In addition, formulations containing pyroquilon as the only active ingredient for the rice blast are registered as agricultural chemicals for the rice blast which are diseases caused by the fungi and the bacterial grain rot of rice which are diseases caused by bacteria. However, for example, the control effect on the cucurbit anthracnose which are diseases caused by the fungi is disclosed. However, it does not disclose the control effect on plant diseases other than the above plant diseases (Patent Document 7).

It discloses that the known tricyclazole used in the present invention exhibits the control effect on the rice blast (Non-Patent Document 4). Formulations, which contain tricyclazole as the only active ingredient for the rice blast, are registered as agricultural chemicals for the rice blast caused by the fungi. However, the formulations do not have a control effect on other plant diseases than the above plant diseases.

It discloses that the known fthalide used in the present invention is known to exhibit the control effect on the rice blast (Non-Patent Document 5). In addition, formulations, which contain fthalide as the only active ingredient for the rice blast, are registered as agricultural chemicals for the rice blast caused by the fungi. However, for example, it discloses that the control effect on the cucurbit anthracnose which are diseases caused by the fungi. However, it does not disclose the control effect on other plant diseases than the above plant diseases (Patent Document 7).

It discloses that a method for controlling anthracnose, which is a plant disease by fungi, by using MBI-R agents which are pyroquilon and fthalide and MBI-D agents which are fenoxanil and diclocymet (Patent Document 7).

There has been known that carpropamid, which inhibits the dehydratase in melanin biosynthesis and is known as the MBI-D agent, has a control effect on bacterial leaf blight of rice (*Xanthomonas oryzae* pv. *oryzae*) and Chinese cabbage soft rot (*Erwinia carotovora* subsp. *carotovora*) which are diseases caused by bacteria (Patent Document 8). However, since activity of carpropamid is due to an induction of resistance to host plants not related to the melanin biosynthesis, one skilled in the art could not easily foresee that the MBI-P agents or MBI-R agents exhibit the control effect on their diseases even those agents exhibit act on the same melanin biosynthesis. Therefore, it does not known that tolprocarb, which is the MBI-P agent, is used for horticultural crops and exhibits the control effects on their diseases and further pyroquilon, tricyclazole and fthalide, which are the MBI-R agents, are used for horticultural crops and exhibit the control effect on other diseases than anthracnose.

The melanin biosynthesis inhibitors (MBI-P agent, MBI-R agent, and MBI-D agent) are known to not show remarkable mycelium elongation inhibitory activity (also referred to as "antibacterial activity") on a cultural medium and inhibits an accumulation of melanin to inhibit a coloration of colony on the culture medium (colony coloring inhibitory activity). When the control effects of the MBI agents are evaluated on the culture medium, the colony coloring inhibitory activity is an indicator.

RELATED DOCUMENT

Patent Document

Patent Document 1: WO2005/042474
Patent Document 2: WO2006/106811
Patent Document 3: WO2008/075453
Patent Document 4: GB1394373
Patent Document 5: U.S. Pat. No. 4,550,165
Patent Document 6: US20080221110
Patent Document 7: JPA2008024682
Patent Document 8: JP2000109404

Non-Patent Document

Non-Patent Document 1: Acta Biochemica Polonica 2006, 53, (3):429-443 (Review)
Non-Patent Document 2: Pesticide Outlook 2001, 12, 32-35
Non-Patent Document 3: FRAC Code List 2016
Non-Patent Document 4: Pesticide Biochemistry and Physiology 1978, 8 (1):26-32
Non-Patent Document 5: Japanese Journal of Phytopathology 1982, 48 (1):58-63

SUMMARY OF THE INVENTION

Technical Problem

The present inventions were completed under the background art as described above. According to the findings on existing an agent for controlling plant disease, at least one selected from the group consisting of tolprocarb, pyroquilon, tricyclazole, fthalide and salts thereof is not enough to control fungal, bacterial or viral diseases which are different from the known plant diseases to be controlled by those agents such as rice blast. As a result, it was required a new agent for controlling plant diseases and a method for controlling plant diseases.

Objects of the present inventions are to provide a new composition for controlling plant diseases which contain at least one selected from the group consisting of tolprocarb, pyroquilon, tricyclazole, fthalide and salts thereof, and a method for controlling plant diseases applying the composition. The present inventions exhibit a high control effect on different plant diseases from the known diseases to be controlled by those agents such as rice blast and exhibit high activity even when an active ingredient amount applied to diseases habitat environment is small, and that does not cause phytotoxicity to the plants.

Solution to Problem

The present inventors have intensively studied effects of at least one selected from the group consisting of tolprocarb, pyroquilon, tricyclazole, fthalide and salts thereof on plant diseases such as fungal diseases, bacterial diseases and viral diseases which are different from the known plant diseases to be controlled such as rice blast. As the result of the study, they have completed the present invention based on the following findings. That is, they have found that tolprocarb, or salt thereof exhibits the control effect on plant diseases such as fungal diseases other than rice blast which is a fungal disease, bacterial diseases other than bacterial grain rot of rice and viral diseases, and further that pyroquilon, tricyclazole, fthalide or salts thereof exhibits the control effect on plant diseases of fungal diseases other than rice blast and anthracnose, bacterial diseases other than bacterial grain rot of rice or viral diseases.

In addition, the composition for controlling plant diseases and the method for applying the composition of the present invention are new inventions which are not disclosed in any of Patent Documents 1 to 8 and Non-Patent Documents 1 to 5.

That is, the present invention relates to the following [1] to [18].

[1] A composition for controlling plant diseases comprising at least one selected from the group consisting of tolprocarb, pyroquilon, tricyclazole, fthalide and salts thereof as an active ingredient, which is used to control at least one plant disease selected from the group consisting of fungal diseases other than rice blast, bacterial diseases other than bacterial grain rot of rice and viral diseases.

[2] The composition according to [1], wherein the active ingredient is tolprocarb or salts thereof.

[3] The composition according to [1], wherein the active ingredient is at least one selected from the group consisting of pyroquilon, tricyclazole, fthalide and salts thereof, and the plant disease is at least one selected from the group consisting of the fungal diseases other than rice blast and anthracnose and bacterial diseases other than bacterial grain rot of rice and viral diseases.

[4] The composition according to [1], wherein the plant disease is at least one selected from the group consisting of the fungal diseases, bacterial diseases and viral diseases of horticultural crops.

[5] The composition according to [1], wherein the plant disease is at least one selected from the group consisting of fungal diseases, bacterial diseases and viral diseases of the horticultural crops other than anthracnose.

[6] The composition according to [1], wherein the bacterial diseases are bacterial leaf blight of rice and/or rice bacterial palea browning.

[7] The composition according to [1], wherein the plant disease is at least one selected from the group consisting of diseases caused by at least one bacteria selected from the group consisting of *Xanthomonas, Pseudomonas* and *Erwinia*;

diseases caused by at least one fungus selected from the group consisting of powdery mildew and downy mildew; and diseases caused by at least one virus selected from the group consisting of cucumber mosaic virus (CMV), tomato yellow leaf curl virus (TYLCV) and rice stripe virus (RSV).

[8] A method for use of a composition comprising at least one selected from the group consisting of tolprocarb, pyroquilon, tricyclazole, fthalide and salts thereof as an active ingredient to control at least one plant disease selected from the group consisting of fungal diseases other than rice blast, bacterial diseases other than bacterial grain rot of rice and viral diseases.

[9] The method according to [8], wherein the active ingredient is tolprocarb or salts thereof.

[10] The method according to [8], wherein the active ingredient is at least one selected from the group consisting of pyroquilon, tricyclazole, fthalide and salts thereof, and the plant disease is selected from the group consisting of fungal diseases other than rice blast and anthracnose, bacterial diseases other than bacterial grain rot of rice and viral diseases.

[11] The method according to [8], wherein the plant disease is at least one selected from the group consisting of fungal diseases, bacterial diseases and viral diseases of horticultural crops.

[12] The method according to [8], wherein the plant disease is at least one selected from the group consisting of the fungal diseases, bacterial diseases and viral diseases of the horticultural crops other than anthracnose.

[13] The method according to [8], wherein the bacterial diseases are bacterial leaf blight of rice and/or rice bacterial palea browning.

[14] The method according to [8], wherein the plant disease is at least one selected from the group consisting of diseases caused by at least one bacteria selected from the group consisting of *Xanthomonas, Pseudomonas* and *Erwinia*;

diseases caused by at least one fungus selected from the group consisting of powdery mildew and downy mildew; and diseases caused by at least one virus selected from the group consisting of cucumber mosaic virus (CMV), tomato yellow leaf curl virus (TYLCV) and rice stripe virus (RSV).

[15] The method for according to [8], wherein the use of the composition is treatment for plants or soil.

[16] The method according to [15], wherein the treatment for soil is one selected from soil drench, mixing with soil and/or treatment to soil surface before planting, at planting or after planting.

[17] The method according to [15], wherein the application method is spraying to plants.

[18] The method according to [15], wherein the application method is treatment to seeds.

Advantageous Effects of Invention

According to the composition for controlling plant diseases and the method for applying the same of the present invention, at least one selected from the group consisting of tolprocarb, pyroquilon, tricyclazole, fthalide and salts thereof can obtain the excellent control effect on plant diseases, which are different from the known plant diseases as objects of each agent described above, such as fungal diseases, bacterial diseases and viral diseases. The diseases caused by bacteria include bacterial leaf blight of rice (*Xanthomonas oryzae* pv. *oryzae*), rice bacterial palea browning (*Erwinia herbicola*), Chinese cabbage soft rot (*Erwinia carotovora* subsp. *carotovora*), cucumber leaf spot bacterial diseases (*Pseudomonas syringae* pv. *lachrymans*) and cabbage black rot (*Xanthomonas campestris* pv. *campestris*) and the like. The diseases caused by fungi include cucumber powdery mildew (*Sphaerotheca cucurbitae*), tomato powdery mildew (*Oidium neolycopersici*) and cucumber downy mildew (*Pseudoperonospora cubensis*) and the like. The diseases caused by virus include cucumber mosaic virus (CMV), tomato yellow leaf curl virus (TYLCV) and rice stripe virus (RSV) and the like.

DESCRIPTION OF EMBODIMENTS

Next, a composition for controlling plant diseases and a process for producing the same, which are the first invention in the present application, are described below.

A composition for controlling plant diseases of the present invention contain at least one selected from the group consisting of an MBI-P agent (tolprocarb or salts thereof) and an MBI-R agent (pyroquilon, tricyclazole, fthalide or salts thereof) which are melanin biosynthesis inhibitors as an active ingredient. The composition is used for controlling at least one selected from the group consisting of fungal diseases other than the rice blast, bacterial diseases other than the bacterial grain rot of rice, and viral diseases.

As the active ingredient contained in the composition for controlling plant diseases of the present invention, the tolprocarb is preferable from the viewpoint of the effect of the present invention.

In addition, from the viewpoint of the effects of the present invention, in the cases that the active ingredient of the composition for controlling plant diseases of the present invention is at least one selected from the group consisting of pyroquilon, tricyclazole, fthalide and a salt thereof, the composition is preferably used for controlling at least one selected from the group consisting of fungal diseases other than the rice blast and anthracnose, bacterial diseases other than the bacterial grain rot of rice and viral diseases.

MBI-P agents (tolprocarb or salts thereof) or MBI-R agents (pyroquilon, tricyclazole, fthalide or salts thereof) which are melanin biosynthesis inhibitors in the present invention are known compounds, educts of the compounds are disclosed as CAS No. 911499-62-2, 57369-32-1, 41814-78-2, or 27355-22-2, respectively, and these are known that compositions containing at least one compounds as an active ingredient are used only for rice.

The composition for controlling plant diseases of the present invention can be produced according to the usual method. That is, in the process for producing the composition for controlling plant diseases, active ingredients are independently used. Respectively, other active ingredients may be added to the composition containing one active ingredient and the composition containing at least one active ingredient may be produced. The composition for controlling plant diseases of the present invention can be produced by mixing a carrier and the composition described above. If necessary, by further adding adjuvants such as a surfactant, a wetting agent, an adhesive agent, a thickener, an antimicrobial antifungal agent, a coloring agent, or a stabilizer, it is possible to formulate into, for example, granules, wettable powders, flowable formulation, granulated wettable powders, dust, emulsifiable concentrates and the like in accordance with the usual methods.

A content of the active ingredient in the composition for controlling plant diseases of the present invention is usually in the range of 0.005 to 99% by weight, preferably in the range of 0.1 to 90%, and more preferably 0.3 to 80%.

The content of the active ingredient in the composition for controlling plant diseases of the present invention is appropriately determined because it varies depending on the kind of formulation. In general, a dust contains the active ingredient in the range of 0.01 to 30% by weight. A wettable powder contains it in the range of 0.1 to 80% by weight. A granule contains it in the range of 0.5 to 25% by weight. An emulsifiable concentrate contains it in the range of 2 to 50% by weight. A flowable formulation contains it in the range of 1 to 50% by weight; and a dry flowable formulation contains it in the range of 1 to 80% by weight.

In the composition for controlling plant diseases of the present invention, the preferred content of the active ingredient is 0.05 to 10% by weight in the dust, 5 to 60% by weight in the wettable powder, 2 to 15% by weight in the granule, 5 to 50% by weight in the emulsifiable concentrate, 5 to 50% by weight in the flowable formulation and 5 to 60% by weight in the dry flowable formulation.

The carrier used in the above composition means a synthetic or natural inorganic or organic substance blended to facilitate an access of the active ingredient to a site to be treated and to facilitate storage, transport and handling of the active ingredient. The carrier can be used in either a solid form or a liquid form as long as it is usually used in the composition for controlling plant diseases, and therefore is not limited to a specific form.

Specific examples of the solid carrier include inorganic substances such as bentonite, montmorillonite, kaolinite, diatomaceous earth, white earth, talc, clay, vermiculite, gypsum, calcium carbonate, amorphous silica and ammonium sulfate; vegetable organic materials such as soybean flour, wood flour, saw dust, wheat flour, glucose, lactose and sucrose; urea and the like.

Specific examples of the liquid carrier include aromatic hydrocarbons such as toluene, xylene and cumene and naphthenes; paraffin hydrocarbons such as n-paraffin, iso-paraffin, liquid paraffin, kerosene, mineral oil and polybutene; ketones such as acetone and methyl ethyl ketone; ethers such as dioxane and diethylene glycol dimethyl ether; alcohols such as ethanol, propanol and ethylene glycol; carbonates such as ethylene carbonate, propylene carbonate and butylene carbonate; aprotic solvent such as dimethylformamide and dimethyl sulfoxide; water and the like.

In addition, in order to enhance the efficacy of the active ingredient in the composition of the present invention, the adjuvants can be used alone or in combination depending on the purpose, in consideration of a kind of the formulation, the treatment method and the like. Examples of the adjuvant include a surfactant, a binder, a disintegrator, a stabilizer, a pH adjuster, an antimicrobial antifungal agent, a thickener, an antifoaming agent, an antifreezing agent and the like.

In general, examples of surfactants, which are used for purpose of emulsification, dispersion, spreading, and/or wetting of the composition for controlling plant diseases, include nonionic surfactants such as sorbitan fatty acid esters, polyoxyethylene sorbitan fatty acid esters, sucrose fatty acid esters, polyoxyethylene fatty acid esters, polyoxyethylene resin acid esters, polyoxyethylene fatty acid diesters, polyoxyethylene castor oil, polyoxyethylene alkyl ethers, polyoxyethylene alkyl phenyl esters, polyoxyethylene dialkyl phenyl ethers, formalin condensates of polyoxyethylene alkyl phenyl ethers, polyoxyethylene-polyoxypropylene block polymers, alkyl polyoxyethylene-polyoxypropylene block polymer ethers, alkyl phenyl polyoxyethylene-polyoxypropylene block polymer ethers, polyoxyethylene alkylamines, polyoxyethylene fatty acid amides, polyoxyethylene bisphenyl ethers, polyoxyalkylene benzyl phenyl ethers, polyoxyalkylene styryl phenyl ethers, higher-alcohol polyoxyalkylene adduct, polyoxyethylene ether, ester-type silicon surfactants and fluorine surfactants; anionic surfactants such as alkyl sulfates, polyoxyethylene alkyl ether sulfates, polyoxyethylene alkyl phenyl ether sulfates, polyoxyethylene benzyl phenyl ether sulfates, polyoxyethylene styryl phenyl ether sulfates, polyoxyethylene polyoxypropylene block polymer sulfates, paraffin sulfonates, alkane sulfonates, AOS, dialkyl sulfosuccinates, alkylbenzene sulfonates, naphthalene sulfonates, dialkyl naphthalene sulfonates, formalin condensates of naphthalene sulfonates, alkyl diphenyl ether disulfonates, lignin sulfonates, polyoxyethylene alkyl phenyl ether sulfonates, polyoxyethylene alkyl ether sulfosuccinic acid half esters, fatty acid salts, N-methyl-fatty acid sarcosinates, resin acid salts, polyoxyethylene alkyl ether phosphates, polyoxyethylene phenyl ether phosphates, polyoxyethylene dialkyl phenyl ether phosphates, polyoxyethylene benzylphenyl ether phosphates, polyoxyethylene benzylphenyl phenyl ether phosphates, polyoxyethylene styrylphenyl ether phosphates, polyoxyethylene styrylphenyl phenyl ether phosphates, polyoxyethylene polyoxypropylene block polymer phosphates, phosphatidylcholine, phosphatidyl ethanol imine, alkyl phosphates and sodium tripolyphosphate; polyanionic polymer surfactants derived from acrylic acid, acrylonitrile and acrylamidomethyl propanesulfonic acid; cationic surfactants such as alkyltrimethylammonium chloride, methyl polyoxyethylene alkylammonium chloride, alkyl N-methylpyridinium bromide, monomethylammonium chloride, dialkylmethylammonium chloride, alkylpentamethylpropyleneamine dichloride, alkyldimethylbenzalkonium chloride and benzethonium chloride;
ampholytic surfactants such as dialkyldiaminoethyl betain and alkyldimethylbenzyl betain and the like.

Examples of the wetting agent include polyoxyethylene alkyl phenyl ether, sodium alkylbenzenesulfonate, dioctyl sulfosuccinate, sodium alkylnaphthalene sulphonate, sodium alkylsulfate, sodium alkylnaphthalene sulphonate, sodium alkylsulfate, sodium alkylbenzenesulfonate, alkyl sodium sulfosuccinate, polyoxyethylene alkyl allyl ether, sodium alkylnaphthalenesulfonate, polyoxyethylene nonylphenyl ether and the like.

Examples of the adhesive agent include polyacrylate, polyoxyethylene, wax, polyvinyl alkyl ether, a formalin condensate of alkyl phenol, phosphate ester of starch, synthetic resin emulsion, starches, resin powder, a water-swellable polymer substance, paraffin and the like.

Examples of the binder include sodium alginate, polyvinyl alcohol, gum arabic, CMC sodium or bentonite and the like.

Examples of the disintegrator include CMC sodium, croscarmellose sodium and the like and examples of the stabilizer include a hindered phenol-based antioxidant, and a benzotriazole-based and a hindered amine-based ultraviolet absorbers and the like.

Examples of the pH adjuster include phosphoric acid, acetic acid, sodium hydroxide and the like and examples of the antimicrobial antifungal agent include industrial fungicides such as 1,2-benzoisothiazolin-3-one.

Examples of the thickener include xanthan gum, guar gum, sodium CMC, gum arabic, polyvinyl alcohol, montmorillonite and the like, examples of the antifoaming agent include silicone-based compounds and the like, and examples of the antifreezing agent include propylene glycol, ethylene glycol and the like. However, these adjuvants are not limited to the above.

Examples of the coloring agent include carbon black, red iron oxide, Solvent Red 23, C.I. Acid Blue 1, C.I. Acid Yellow 23 and the like.

Next, a method for controlling plant diseases which is the second invention described in the present application are described below.

The method for controlling plant diseases of the present invention is a method using the composition which is the first invention of the present application containing at least one selected from MBI-P agents (tolprocarb and salts thereof) and MBI-R agents (pyroquilon, tricyclazole, fthalide and salts thereof) which are melanin biosynthesis inhibitors. The method for controlling plant diseases of the present invention can control at least one disease selected from fungal diseases other than rice blast, bacterial diseases other than bacterial grain rot of rice and viral diseases.

Examples of the method for applying the composition for controlling plant diseases of the present invention include foliar application, seeding box treatment, application along crop row by rice transplanter, paddy water application, spraying treatment to soil surface, soil incorporation after spraying treatment to the surface, injection treatment into soil, soil incorporation after injection treatment into soil, soil drench treatment, soil incorporation after soil drench treatment, blow treatment to plant seeds, smear treatment to plant seeds, dip treatment to plant seeds or dust coating treatment to plant seeds and mixing treatment with plant seeds and the like. However, any method can be used as long as they can apply the composition for controlling plant diseases of the present invention. The composition for controlling plant diseases of the present invention usually exerts sufficient efficacy in any application method utilized by those skilled in the art.

When the application method is treatment to soil, application method can be selected from soil drench, soil incorporation and/or treatment to soil surface before planting, at planting or after planting cultivated crops.

In addition, by combining the composition for controlling plant diseases of the present invention with the composition for controlling plant diseases of the present invention or with the known composition for controlling plant diseases not described in the present invention as the other agent, the combined compositions are used to control the plant diseases. The application method can be performed according to the application criterion described above. However, specific methods such as the order of treatment, the time to treatment (period), and the number of treatments for the application are not particularly limited as long as they have the effect of controlling the plant diseases. However, can be appropriately selected and determined according to the plant diseases to be targeted, plants, environment related to other applications.

Furthermore, the composition for controlling plant diseases of the present invention can be formed by combining at least two of the compositions for controlling plant diseases respectively containing different active ingredients (that is, containing at least one active ingredient). Also, the composition of the present invention can be formed by appropriately combining the composition for controlling plant diseases containing the known active ingredient other than the active ingredient which is the melanin biosynthesis inhibitors of the present invention with a composition for controlling plant disease containing one or more active ingredients. This composition can be diluted with water to be used as a treatment solution. In addition, the composition for controlling plant diseases of the present invention can be formed as a mixture by combining at least two of compositions for controlling plant diseases respectively containing a different active ingredient(s) (that is, containing at least one active ingredient) during using the composition. Also, the composition of the present invention can be formed as a mixture by appropriately combining the composition for controlling plant diseases containing the known active ingredient other than the active ingredient which is the melanin biosynthesis inhibitors of the present invention with a composition for controlling plant diseases containing one or more active ingredients during using the composition. These compositions can be further diluted with water to be used as a spray solution (tank mix method).

An application amount or an application concentration of the composition for controlling plant diseases of the present invention is not particularly limited as long as the composition for controlling plant diseases has an effect of controlling plant diseases. The application amount and the application concentration can be appropriately selected and be determined based on a target crop, a target harmful organism, occurrence of harmful organism, formulation of a compound, an application method and various environmental conditions.

When the composition is sprayed, the amount of the active ingredient is usually 10 to 10,000 g per hectare and preferably 25 to 5,000 g per hectare. In addition, when the wettable powder, flowable formulation or the emulsifiable concentrate of the composition is diluted with water and dispersed, a dilution rate thereof is usually 5 to 50,000 times, preferably 10 to 20,000 times, and more preferably 15 to 10,000 times. In addition, when the seed treatment is performed using the composition, the used amount of the composition is usually 0.001 to 50 g, preferably 0.01 to 10 g, per kg of seed.

When the composition is subjected to the foliar application, the spraying treatment to soil surface, the injection treatment into soil, the soil drench treatment and the like, the composition is diluted at an appropriate concentration in an appropriate carrier, and then the treatment can be performed. When the composition is brought into contact with plant seeds, the plant seeds may be dipped in the composition as they are. In addition, the composition can be diluted at an appropriate concentration in the appropriate carrier, and then can be dipped, dust-coating, blowed or smeared to plant seeds to be used. The used amount of the composition in the case where the dust-coating, blowing and smearing treatments are performed is usually about 0.05 to 50% and preferably 0.1 to 30% with respect to the weight of the dried plant seed weight. However, the used amount thereof can be appropriately selected and be determined according to the type of plant seeds as the treatment target and the like without being limited to the above range.

Examples of appropriate carriers include liquid carriers of organic solvents such as water and ethanol; and solid carriers of inorganic materials such as bentonite, montmorillonite, kaolinite, diatomaceous earth, kaolin, talc, clay, vermiculite, gypsum, calcium carbonate, amorphous silica, ammonium sulfate;

vegetable organic materials such as soybean flour, wood flour, saw dust, wheat flour, lactose, sucrose and glucose; urea; and the like. The carriers are not limited thereto.

In the present specification, the plant means a living organism which lives by doing photosynthesis without moving. Specific examples of the plants include rice, wheat, barley, maize, grape, apple, pear, peach, sweet cherry, persimmon, citrus, bean, Mexican bean, strawberry, potato, cabbage, Chinese cabbage, lettuce, tomato, cucumber, eggplant, watermelon, beet sugar, spinach, snap pea, pumpkin, sugar cane, tobacco, green pepper, sweet potato, taro, konjac, rape, cotton, sunflower, tulip, chrysanthemum, spring onion, onion, garlic, ginger, grass, and genetically modified plants and the like. The plant is not limited thereto.

In the present specification, the horticultural crops refers to fruit trees (tree plants which bear eatable fruits), vegetables (herbaceous plants which are cultivated for food except for maize, rice, wheat and barley) and flowers (cops which are cultivated for ornamental plant). Specific examples of the horticultural crop include grape, apple, pear, peach, sweet cherry, persimmon, citrus, bean, Mexican bean, strawberry, potato, cabbage, Chinese cabbage, lettuce, tomato, cucumber, eggplant, watermelon, spinach, snap pea, pumpkin, sugar cane, tobacco, green pepper, sweet potato, taro, konjac, rape, cotton, sunflower, tulip, chrysanthemum, spring onion, onion, garlic, ginger, and genetically modified plants thereof and the like. The horticultural crops are not limited thereto.

In the present specification, the seed plant means a seed plant that a young plant accumulates nutrients for sprouting and is to be used for agriculture propagation. Specific examples of the seeds of plants include seeds of plants such as maize, bean, cotton, rice, beet sugar, wheat, barley, sunflower, potato, cucumber, eggplant, spinach, snap pea, pumpkin, sugar cane, tobacco and green pepper and rape; seed tubers such as taro, potato, sweet potato and konjac; seed bulbs such as eatable lily, tulip and scallion;

plants produced by artificially altering genes such as soybean, maize, cotton which are not originally existed in nature but have herbicide tolerance; rice, tobacco and the like which are adapted to cold region; maize, cotton, potato and the like to which a herbicidal property production function is applied and the like. The seed plant is not limited thereto.

The composition for controlling plant diseases of the present invention can be used while being mixed with, as the other agent, other agricultural chemicals such as insecticide, miticide, nematicide, fungicide, herbicide, a plant growth regulator, microbial agricultural chemical, soil conditioner and fertilizer, and can be a mixed formulation therewith.

Specific examples of the fungicide, the insecticide, the miticide and the nematicide include allethrin, tetramethrin, resmethrin, phenothrin, furamethrin, permethrin, cypermethrin, deltamethrin, cyhalothrin, cyfluthrin, fenpropathrin, tralomethrin, cycloprothrin, flucythrinate, fluvalinate, acrinathrin, tefluthrin, bifenthrin, empenthrin, betacyfluthrin, cypermethrin, fenvalerate, esfenvalerate, flubrocythrinate, metofluthrin, profluthrin, dimefluthrin, flubrocythrinate, silafluofen, pyrethrum extract, etofenprox, halphenprox, DDVP, cyanophos, fenthion, fenitrothion, tetrachlorvinphos, dimethylvinphos, propaphos, methyl parathion, temephos, phoxim, acephate, isofenphos, salithion, DEP, EPN, ethion, mecarbam, pyridafenthion, diazinon, pirimiphos-methyl, etrimfos, isoxathion, quinalphos, chlorpyrifos-methyl, chlorpyrifos, phosalone, phosmet, methidathion, oxydeprofos, vamidothion, malathion, phenthoate, dimethoate, formothion, thiometon, disulfoton, phorate, terbufos, profenofos, prothiofos, sulprofos, pyraclofos, monocrotophos, naled, fosthiazate, trichlorfon, ethoprophos, cadusafos, clofenvinfos, dichlofenthion, ethylthiometon, methamidophos, dichlorvos, tebupirimfos, omethoate, triazophos, oxydemeton-methyl, azinphos-methyl, chlorethoxyfos, dicrotophos, disulfoton, fenamiphos, phosphamidon, trichlorfon, chlormephos, demeton-S-methyl, mevinphos, parathion, tebupirimfos, MEP, malathion, DCIP, MPP, NAC, MTMC, MIPC, BPMC, XMC, PHC, MPMC, ethiofencarb, bendiocarb, pirimicarb, carbosulfan, benfuracarb, methomyl, oxamyl, aldicarb, thiodicarb, alanycarb, carbofuran, methiocarb, fenothiocarb, formetanate, xylyl methylcarbamate, propoxur, isoprocarb, furathiocarb, imidacloprid, nitenpyram, acetamiprid, dinotefuran, thiamethoxam, thiacloprid, clothianidin, bromopropylate, dicofol, endosulfan, lindane, diflubenzuron, chlorfluazuron, teflubenzuron, triflumuron, flufenoxuron, flucycloxuron, hexaflumuron, fluazuron, diafenthiuron, novaluron, noviflumuron, bistrifluron, chromafenozide, halofenozide, methoxyfenozide, lufenuron, cyromazine, triazamate, tebufenozide, buprofezin, isoprothiolane, nicotine sulfate, polynactin complex, abamectin, milbemectin, lepimectin, BT agent, spinosad, rotenone, cartap, thiocyclam, bensultap, thifluzamide, flutolanil, mepronil, pencycuron, ethaboxam, oxycarboxin, carboxin, silthiofam, carpropamid, diclocymet, fenoxanil, azoxystrobin, metominostrobin, orysastrobin, kresoximmethyl, fluoxastrobin, trifloxystrobin, dimoxystrobin, pyraclostrobin, picoxystrobin, kasugamycin, validamycin, blasticiden-S-benzylaminobenzenesulfonate, polyoxin, tecloftalam, oxytetracycline, streptomycin, blasticidin S, mildiomycin, polyoxins, ferimzone, fenarimol, pyrifenox, nuarimol, bupirimate, simeconazole, furametpyr, ipconazole, triflumizol, prochloraz, pefurazoate, imazalil, imibenconazole, etridiazol, epoxiconazole, oxpoconazole-fumarate, diniconazole, difenoconazole, cyproconazole, tetraconazole, tebuconazole, triadimenol, triadimefon, triticonazole, bitertanol, hymexazol, fenbuconazole, fluquinconazole, flusilazole, flutriafol, prothioconazole, propiconazole, bromuconazole, hexaconazole, penconazole, metconazole, copper, copper nonylphenol sulfonate, copper oxychloride, basic copper sulphate, oxine-copper, DBEDC, anhydrous copper sulfate, copper dihydroxide, thiophanate-methyl, benomyl, thiabendazole, thiophanate, carbendazim, fuberidazole, EDDP, IBP, tolclofos-methyl, fosetyl, dinocap, pyrazophos, metalaxyl, oxadixyl, benalaxyl, metalaxyl M, iprodione, procymidone, vinclozolin, chlozolinate, thiram, mancozeb, propineb, zineb, metiram, maneb, ziram, amobam, hydroxyisoxazole, methasulfocarb, chloropicrin, flusulfamide, dazomet, methyl isothiocyanate, hydroisoxazole-potassium, echlomezol, 1,3-dichloropropene, TPN, captan, mepanipyrim, cyprodinil, pyrimethanil, rapeseed oil, machine oil, sulfur, lime sulfur, zinc sulfate, fentin, sodium hydrogen carbonate, potassium hydrogen carbonate, hypochlorite, dimethomorph, fenpropidin, fenpropimorph, spiroxamine, tridemorph, dodemorph, flumorph, chlorobenzilate, phenisobromolate, tetradifon, CPCBS, BPPS, chinomethionate, amitraz, benzomate, hexythiazox, fenbutatin oxide, cyhexatin, dienochlor, clofentezine, pyridaben, fenpyroximate, fenazaquin, tebufenpyrad, pyrimidifen, acequinocyl, bifenazate, etoxazole, spirodiclofen, spiromesifen, amidoflumet, diflovidazin, kelthane, pymetrozine, fipronil, fenoxycarb, pyriproxyfen, methoprene, hydroplane, kinoprene, endosulfan, triathlon, benzoepin, emamectin benzoate, emamectin benzoate, flupyrazofos, fluacrypyrim, fluphenazine, indoxacarb, tolfenpyrad, gamma-cyhalothrin, ethiprole, acetoprole, amidoflumet, chlorfenapyr, flonicamid, flufenerim, pyridalyl, sodium oleate, potassium oleate, azadirachtin, carbam, carbam sodium, propargite, azocyclotin, benzoximate, metaldehyde, protrifenbute, benclothiaz, flubendiamide, metaflumizone, nicotine sulfate, lime nitrogen, machine oil, bensultap, flubendiamide, chlorantraniliprole, cyantraniliprole, pyrifluquinazon, metaflumizone, oxolinic acid, *pseudomonas* CAB-02, tricoderma atroviride, fludioxonil, DPC, 4-[3-(3,4-dimethoxyphenyl)-3-(4-fluorophenyl)acryloyl]morpholine, anilazine, iprovalicarb, imazalil, iminoctadine albesilate, quinoxyfen, chinomethionate, metal silver, quintozene, guazatine, chlorothalonil, chloroneb, cyazofamid, diethofencarb, dichlofluanid, dichloran, dithianon, diflumetorim, dimethirimol, cymoxanil, silthiofam, spiroxamine, zoxamide, thiadiazin, dodine, triforine, tolylfluanid, nitrothal-isopropyl, famoxadone, fenamidone, fenitropan, fenpiclonil, fenhexamid, folpet, fluazinam, fluoroimide, propamocarb, propamocarb hydrochloride, propylene glycol fatty acid esters, prohexadione calcium, benzothiazole, benthiavalicarb isopropyl, myclobutanil, organonickel, resveratrol, penthiopyrad, diclomezine, iminoctadine triacetate, tianidil, tiadinil, probenazole, acibenzolar-S-methyl, mandipropamid, pyribencarb, amisulbrom, isotianil, tebufloquin and fluopicolide. However, the present invention is not limited thereto. The compositions of the present invention can be used in combination of one or more.

Examples of the other agent to be mixed more preferably include dinotefuran, thiamethoxam, flusulfamide, simeconazole, penthiopyrad and the like. Synergistic effects can be expected by mixing these other agents. However, the other agents are not limited thereto. The compositions of the present invention can be used in combination of one or more.

The synergistic effect is to show an excellent unexpected effect in the case that two or more compounds are mixed and/or used together than alone.

The plant diseases in the present invention mainly refers to diseases caused by fungi, bacteria, and viruses. The fungi are eukaryotic organisms belonging to eumycota or myxomycete, and the eumycota includes basidiomy-cotaina, ascomycotina, deuteromycotina, zygomycotaina and mastigomycotina (Oomycetes), and a cell wall is made of chitin glucan or cellulose glucan and is a microscopic-sized microorganism that forms a filamentous, branched trophozoite and forms spores. The myxomycota is a microscopic-sized microorganism that forms plasmodium as trophozoite and forms zoospores. Bacteria are the smallest cell organisms belonging to prokaryotes, and are spherical, rod-like or spiral. Bacteria are divided into gram positive bacteria and gram negative bacteria according to the composition of the cell wall peptides, and many phytopathogenic bacteria belong to the gram negative bacteria. In addition, irregular plastic plasmids lacking cell walls are also contained. The virus is encapsulated with a nucleic acid composed of DNA or RNA and an outer shell (capped) composed of a protein. The virus generally has a rod shape, a horn shape, a spherical shape, a double nose bulb shape, a bacillus shape or a thread shape, is an electron microscopic size, and includes viroid composed of only low-molecular-weight RNAs that do not have capsids. The compositions of the present invention can be used for one or more plant diseases and one or more fungi, bacteria and viruses.

The composition for controlling plant diseases of the present invention and the control method using the composition exhibit a control effect on the plant diseases, in which tolprocarb, pyroquilon, tricyclazole and fthalide as active ingredients or salts thereof are effective for the plant diseases to be controlled, that is, on rice blast (*Pyricularia oryzae*) and bacterial grain rot of rice (*Burkholderia glumae*). Furthermore, the present inventions exhibit effects on at least one plant disease selected from the group consisting of fungal diseases other than the rice blast, bacterial diseases other than the bacterial grain rot of rice and viral diseases. Hereinafter, the specific diseases to be controlled by the present invention are illustrated.

Examples of the plant diseases may include as follows. Examples of diseases caused by fungi may include rice diseases such as rice blast (*Pyricularia oryzae*), sheath blight (*Thanatephorus cucumeris* (Frank) Donk), Helminthosporium leaf spot (*Cochliobolus miyabeanus*), "bakanae" disease (*Gibberella fujikuroi*), dumping-off (*Pythium* spp., *Fusarium* spp., *Trichoderma* spp., *Rhizopus* spp., *Rhizoctonia solani* and the like), rice false smut (*Claviceps virens*) and smut (*Tilletia barelayana*);

wheat diseases such as powdery mildew (*Erysiphe graminis* f. sp. *hordei*; f. sp. *tritici*), rust (*Puccinia striiformis; Puccinia graminis, Puccinia recondita, Puccinia hordei*), leaf spot (*Pyrenophora graminea*), net blotch (*Pyrenophora teres*), Fusarium blight (*Fusarium graminearum, Fusarium culmorum, Fusarium avenaceum, Microdochium nivale*), snow blight (*Typhula incarnata, Typhula ishikariensis, Micronectriella nivalis*), loose smut (*Ustilago nuda, Ustilago tritici, Ustilago nigra, Ustilago avenae*), bunt (*Tilletia caries, Tilletia pancicii*), eye spot (*Pseudocercosporella herpotrichoides*), foot rot (*Rhizoctonia cerealis*), Rhynchosporium leaf blotch (*Rhynchosporium secalis*), Septoria leaf blotch (*Septoria tritici*), glume blotch (*Leptosphaeria nodorum*), dumping-off (*Fusarium* spp., *Pythium* spp., *Rhizoctonia* spp., *Septoria nodorum, Pyrenophora* spp.), take-all (*Gaeumannomyces graminis*), anthracnose (*Colletotrichum gramaminicola*), ergot (*Claviceps purpurea*) and lead spot (*Cochliobolus sativus*);

sweetcorn diseases such as Fusarium blight (*Fusarium graminearum* and the like), dumping-off (*Fusarium avenaceum, Penicillium* spp, *Pythium* spp., *Rhizoctonia* spp), rust (*Puccinia sorghi*), Helminthosporium leaf spot (*Cochliobolus heterostrophus*), smut (*Ustilago maydis*), anthracnose (*Colletotrichum gramaminicola*) and north leaf spot (*Cochliobolus carbonum*);

grape diseases such as downy mildew (*Plasmopora viticola*), rust (*Phakopsora ampelopsidis*), powdery mildew (*Uncinula necator*), anthracnose (*Elsinoe ampelina*), ripe rot (*Glomerella cingulata*), black rot (*Guignardia bidwellii*), Phomopsis cane and leaf spot (*Phomopsis viticola*), sooty blotch (*Zygophiala jamaicensis*), gray mold (*Botrytis cinerea*), bud blight (*Diaporthe medusaea*), violet root rot (*Helicobasidium mompa*) and white root rot (*Rosellinia necatrix*);

apple diseases such as powdery mildew (*Podosphaera leucotricha*), scab (*Venturia inaequalis*), Alternaria leaf spot (*Alternaria alternata* (Apple pathotype)), ceder apple rust (*Gymnosporangium yamadae*), blossom blight (*Monillia mali*), Valsa canker (*Valsa ceratosperma*), physalospora canker (*Botryosphaeria berengeriana*), anthracnose (*Colletotrichum acutatum*), sooty blotch (*Zygophiala jamaicensis*), black spot (*Gloeodes pomigena*), black spot (*Mycosphaerella pomi*), violet root rot (*Helicobasidium mompa*), white root rot (*Rosellinia necatrix*), canker (*Phomopsis mali, Diaporthe tanakae*) and brown leaf spot (*Diplocarpon mali*);

pear diseases such as black spot (*Alternaria alternata* (Japanese pear pathotype)), scab (*Venturia nashicola*), rust (*Gymnosporangium haraeanum*), Physalospora canker (*Physalospora piricola*), canker (*Diaporthe medusaea, Diaporthe eres*) and west pear late blight (*Phytophthora cactorum*);

peach diseases such as peach scab (*Cladosporium carpophilum*), Phomopsis rot (*Phomopsis* sp.), late blight (*Phytophthora* sp.) and anthracnose (*Gloeosporium laeticolor*);

sweet cherry diseases such as anthracnose (*Glomerella cingulata*), young-fruit rot (*Monilinia kusanoi*) and brown rot (*Monilinia fructicola*);

persimmon diseases such as anthracnose (*Gloeosporium kaki*), angular leaf spot (*Cercospora kaki; Mycosphaerella nawae*) and powdery mildew (*Phyllactinia kakikora*);

citrus diseases such as black spot (*Diaporthe citri*), green mold (*Penicillium digitatum*), blue mold (*Penicillium italicum*) and citrus scab (*Elsinoe fawcettii*);

tomato, cucumber, beans, strawberry, potato, cabbage, eggplant, lettuce diseases such as gray mold (*Botrytis cinerea*); tomato, cucumber, beans, strawberry, potato, rape seed, cabbage, eggplant, lettuce diseases such as Sclerotinia rot (*Sclerotinia sclerotiorum*);

diseases on various vegetables such as tomato, cucumber, beans, Japanese radish, watermelon, eggplant, rape seed, green pepper, spinach, and sugar beet, such as damping-off (*Rhizoctonia* spp., *Pythium* spp., *Fusarium* spp., Phythophthora spp., *Sclerotinia sclerotiorum* and the like);

cucurbitaceae downy mildew (*Pseudoperonospora cubensis*), cucumberpowdery mildew (*Sphaerotheca cucurbitae*), powdery mildew (*Sphaerotheca fuliginea*), anthracnose (*Colletotrichum lagenarium*), gummy stem blight (*Mycosphaerella melonis*), Fusarium wilt (*Fusarium oxysporum*), and late blight (*Phytophthora parasitica, Phytophthora melonis, Phytophthora nicotianae, Phytophthora drechsleri, Phytophthora capsici* and the like);

tomato diseases such as *physalospora* canker (*Alternaria solani*), leaf mold (*Cladosporium fulvam*), tomato powdery mildew (*Oidium neolycopersici*), late blight (*Phytophthora infestans*), fungus (*Fusarium oxysporum*), root rot (*Pythium myriotylum, Pythium dissotocum*), and anthracnose (*Colletotrichum phomoides*);

eggplant diseases such as powdery mildew (*Sphaerotheca fuliginea* and the like), black mold (*Mycovellosiella nattrassii*), late blight (*Phytophthora infestans*) and brown rot (*Phytophthora capsici*);

rape seedblack spot (*Alternaria brassicae*), Brassicaceae diseases such as black spot (*Alternaria brassicae* and the like), white spot (*Cercosporella brassicae*), rust (*Leptospheria maculans*), club root (*Plasmodiophora brassicae*) and downy mildew (*Peronospora brassicae*);

cabbage diseases such as foot rot (*Rhizoctonia solani*) and leaf spot (*Fusarium oxysporum*);

Chinese cabbage diseases such as bottom rot (*Rhizoctonia solani*) and yellow dwarf (*Verticillium dahlie*);

welsh onion diseases such as rust (*Puccinia allii*), black spot disease (*Alternaria porri*), Southern blight (*Sclerotium rolfsii. Sclerotium rolfsii*) and white late blight (*Phytophthora porri*);

soybean diseases such as purpura (*Cercospora kikuchii*), Sphaceloma disease (*Elsinoe glycinnes*), black spot disease (*Diaporthe phaseololum*), Rhizoctonia root rot (*Rhizoctonia solani*), stems late blight (*Phytophthora megasperma*), downy mildew (*Peronospora manshurica*), rust (*Phakopsora pachyrhizi*) and anthracnose (*Colletotrichum truncatum*);

green bean diseases such as anthracnose (*Colletotrichum lindemuthianum*);

black peanut diseases such as astringent disease (*Mycosphaerella personatum*), brown leaf spot (*Cercospora arachidicola*);

pea diseases such as powdery mildew (*Erysiphe pisi*) and downy mildew (*Peronospora pisi*);

broad bean diseases such as downy mildew (*Peronospora viciae*) and late blight (*Phytophthora nicotianae*);

potato diseases such as early blight (*Alternaria solani*), black bruises disease (*Rhizoctonia solani*), late blight (*Phytophthora infestans*), silver scurf (Spondylocladium atrovirens), dry rot (*Fusarium oxysporum, Fusarium solani*) and powdery scab (*Spongospora subterranea*);

sugar beet diseases such as brown leaf spot (*Cercospora beticola*), downy mildew (*Peronospora schachtii*), Aphanomyces root rot (*Aphanomyces cochioides*) and bull's-eye disease (*Phoma batae*); carrot diseases such as black leaf blight (*Alternaria dauci*); strawberry diseases such as powdery mildew (*Sphaerotheca humuli*), late blight (*Phytophthora nicotianae*), anthracnose (*Gromerella cingulata*) and fruit rot (*Pythium ultimum* Trow var. *ultimum*);

tea leaf diseases such as net blister blight (*Exobasidium reticulatum*), white scab (*Elsinoe leucospila*), anthracnose (*Colletotrichum* theaesinensis) and *Physalospora* canker (*Pestalotiopsis* longiseta);

tobacco diseases such as rust (*Alternaria alternata* (Tobacco pathotype)), powdery mildew (*Erysiphe cichoracearum*), anthracnose (*Colletotrichum tabacum*) and late blight (*Phytophthora parasitica*);

cotton diseases such as rood infection fungus (*Fusarium oxysporum*);

sunflower diseases such as *Sclerotinia* rot (*Sclerotinia sclerotiorum*);

rose diseases such as scab (*Diplocarpon rosae*), powdery mildew (*Sphaerotheca pannosa*), late blight (*Phytophthora megasperma*) and downy mildew (*Peronospora sparsa*);

chrysanthemum diseases such as brown leaf spot (*Septoria chrysanthemi-indici*), white rust (*Puccinia horiana*) and late blight (*Phytophthora cactorum*); or grass diseases such as brown patch disease (*Rhizoctonia solani*), dollar spot disease (*Sclerotinia homoeocarpa*), Curvularia leaf blight (*Curvularia geniculata*), rust (*Puccinia zoysiae*), helminthosporium leaf blight (*Cochliobolus* sp.), rhynchosporium leaf blotch (*Rhynchosporium secalis*), rood infection fungus (*Gaeumannomyces graminis*), anthracnose (*Colletotrichum graminicola*), snow mold brown small rot (*Typhula incarnata*), snow mold black small rot (*Typhula ishikariensis*), snow mold large rot (*Sclerotinia borealis*), fairy ring (*Marasmius oreades*) and the like, and *Pythium* blight (*Pythium aphanidermatum*) and the like. Examples of diseases caused by bacteria may include rice diseases such as leaf blight (*Xanthomonas oryzae* pv. *oryzae*), palea browning (*Erwinia herbicola*), grain rot (*Burkholderia glumae*), seedling blight (*Burkholderia plantarii*), leaf streak (*Xanthomonas translucens* f. sp. *oryzae*) and leaf streak (*Burkholderia andropogonis*), fruits tree diseases such as brown spot (*Pseudomonas syringae* pv. *syringae*), lettuce and ginger diseases such as rot (*Pseudomonas cichorii*), soybean diseases such as pustule (*Xanthomonas campestris* pv. *glycines*), vegetable diseases such as soft rot (*Erwinia carotovora* subsp. *carotovora*), Cruciferae family diseases such as black rot (*Xanthomonas campestris* pv. *campestris*), leaf spot (*Pseudomonas cannabina* pv. *alisalensis, Pseudomonas syringae* pv. *maculicola* or *alisalensis* and *Pseudomonas viridiflava*), lettuce diseases such as spot (*Xanthomonas axonopodis* pv. *vitians*), Cucurbitaceae family diseases such as spot (*Pseudomonas syringae* pv. *lachrymans*), marginal blight (*Pseudomonas viridiflava*) and fruit blotch (*Acidovorax avenae* subsp. *citrulli*), peach diseases such as perforation disease (*Pseudomona syringae* pv. *syringae, Erwinia nigrifluens, Xanthomonas campestris* pv. *pruni*), sweet cherry diseases such as gummosis (*Pseudomonas syringae* pv. *syringae*), ornamental plant diseases such as wilt (*Burkholderia caryophylli*), Solanaceae family diseases such as wilt (*Ralstonia solanacearum*), Rosaceae family diseases such as fire blight (*Erwinia amylovora*), grass diseases such as leaf blight (*Xanthomonas campestris* pv. *graminis*), halo blight (*Pseudomonas syringae* pv. *atropurpurea*), sheath rot (*Pseudomonas fuscovaginae*), brown stripe disease (*Acidovolax avenae* subsp. *avenae*) and foot blight (*Burkholderia plantarii*).

Examples of diseases caused by virus or viroid may include diseases caused by virus or viroid such as Alfalfa mosaic virus (AMV), Alstromeria virus X (AlsVX), Arabis mosaic virus (ArMV), Apple chlorotic leaf spot virus (ACLSV), Apple mosaic virus (ApMV), Asparagus virus 1 (AV-1), Barley yellow mosaic virus (BaYMV), Broad bean wilt virus (BBWV), Bean common mosaic virus (BCMV), Beet mosaic virus (BtMV), Beet necrotic yellow vein virus (BNYVV), Beet western yellows virus (BWYV), Broad bean necrosis virus (BBNV), Burdock mottle virus (BdMV), Cactus virus X (CVX), Capsicum chlorosis virus (CaCV), Cauliflower mosaic virus (CaMV), Carnation latent virus (CLV), Carnation mottle virus (CarMV), Cherry leaf roll virus (CLRV), Chinese wheat mosaic virus (CWMV), Chinese yam necrotic mosaic virus (ChYNMV), Citrus leaf rugose virus (CiLRV), Clover yellow vein virus (ClYVV), Cucurbit chlorotic yellows virus (CCYV), Cucumber green mottle mosaic virus (CGMMV), Cucumber mosaic virus (CMV), Chrysanthemum virus B (CVB), Fig mosaic virus (FMV), Garlic virus A (Gary-A), Grapevine ajinashika-associated virus (GAaV), Grapevine berry inner necrosis virus (GINV), Grapevine leafroll-associated virus (GLRaV), Gentian mosaic virus (GMV), Hop mosaic virus (HpMV), Iris yellow spot virus (IYSV), Kyuri green mottle mosaic virus (KGMMV), Lettuce big-vein associated virus (LBVaV), Melon necrotic spot virus (MNSV), Melon yellow spot virus (MYSV), Mirafiori lettuce big-vein virus (MiLBVV), Onion yellow dwarf virus (OYDV), Pepper mild mottle virus (PMMoV), Plum pox virus (PPV), Peanut stunt virus (PSV), Potato virus X (PVX), Potato virus Y (PVY), Rice dwarf virus (RDV), Radish mosaic virus (RMV), Rice stripe virus (RSV), Southern bean mosaic virus (SBMV), Satsuma dwarf virus (SDV), Soybean mosaic virus (SMV), Sweet potato feathery mottle virus (SPFMV), Squash mosaic virus (SqMV), Tomato aspermy virus (INV), Tobacco leaf curl virus (TbLcV), Tobacco ringspot virus (TbRsV), Tomato black ring virus (TBRV), Tomato chlorotic dwarf viroid (TCDVd), Tobacco mosaic virus (TNN), Tomato mosaic virus (ToMV), Tobacco rattle virus (TRV), Tomato spotted wilt virus (TSWV), Turnip mosaic virus (TuMV), Tomato yellow leaf curl virus (TYLCV), Watermelon mosaic virus (WMV), Zucchini yellow mosaic virus (ZYMV), Potato spindle tuber viroid (PSTVd), Apple scar skin viroid (ASSVd), Chrysanthemum chlorotic mottle viroid (CChMVd), Citrus exocortis viroid (CEVd), and Tomato chlorotic dwarf viroid (TCDVd). A disease caused by phytoplasma or spiroplasma may be included as other disease.

Preferred examples of the diseases include diseases caused by bacteria selected from the group consisting of *Xanthomonas* bacteria, *Pseudomonas* bacteria, and *Erwinia*; disease, which are caused by fungi, such as powdery mildew and downy mildew; and diseases caused by virus selected from the group consisting of cucumber mosaic virus (CMV), tomato yellow leaf curl virus (TYLCV), and rice stripe virus (RSV), and the like.

Particularly preferred examples of the diseases include bacterial leaf blight of rice (*Xanthomonas oryzae* pv. *oryzae*), rice bacterial palea browning (*Erwinia herbicola*), bacterial grain rot of rice (*Burkholderia glumae*), rice seedling blight (*Burkholderia plantarii*), tomato powdery mildew (*Oidium neolycopersici*), cucumber powdery mildew (*Sphaerotheca cucurbitae*), cucumber downy mildew (*Pseudoperonospora cubensis*), *Brassica* soft rot disease (*Erwinia carotovora* subsp. *carotovora*), Brassicaceae black rot (*Xanthomonas campestris* pv. *campestris*), cucurbit spot (*Pseudomonas syringae* pv. *lachrymans*), tomato yellow leaf curl virus (TYLCV), cucumber mosaic virus (CMV), rice stripe virus (RSV), and the like. The diseases are not limited thereto.

In the present invention, from the viewpoint of the effect of composition for controlling plant diseases, among the above diseases, the plant disease are preferably selected from the group consisting of fungal diseases other than anthracnose, bacterial diseases and viral diseases of horticultural crops, and more preferably selected from the group consisting of fungal disease, bacterial diseases and viral diseases of horticultural corps. Examples of the bacterial diseases of rice are preferably bacterial leaf blight of rice and/or rice bacterial palea browning.

EXAMPLE

Hereinafter, the present invention is more specifically described with reference to formulation examples and test examples. However, the present invention is not limited only to the formulation examples and the test examples. In addition, "part" of each component described in the following formulation examples means "part by weight".

The compounds used in this test are shown below.
Compound (a) tolprocarb
Compound (b) pyroquilon
Compound (c) tricyclazole
Compound (d) fthalide
Comparative compound (e) carpropamid
Comparative compound (f) diclocymet
Comparative compound (g) fenoxanil
Comparative compound (h) probenazole
Comparative compound (i) acibenzolar S methyl Formulation Example 1—Simplified Emulsifiable Concentrate (E)

One part of the compound (a) of the present invention was dissolved in 100 parts of acetone (propan-2-one) to obtain a simplified emulsifiable concentrate E(a). This simplified emulsifiable concentrate was added to water in the soil drench test. In the spray test, simplified emulsifiable concentrate was added to 0.03% solution of guramin (registered trademark) S (15 parts of (poly(oxyethylene)=nonylphenyl ether, 4 parts of sodium polynaphthylmethanesulfonate, 5 parts of polyoxyethylene fatty acid ester and 76 parts of water: manufactured by Mitsui Chemicals Agro Inc.) were suspended.

Similarly, by using the compound (b), the compound (c) and the compound (d) in place of the compound (a), simplified emulsifiable concentrate E(b), simplified emulsifiable concentrate E(c) and simplified emulsifiable concentrate E(d) were each obtained in a similar manner of simplified emulsifiable concentrate E(a).

Formulation Example 2—Granules (G1)

30 parts of compound (b) of the present invention, 22 parts of bentonite, 45 parts of talc and 3 parts of Sorpol (registered trademark) 5060 (surfactant: manufactured by TOHO Chemical Industry Co., Ltd.) were uniformly kneaded and granulated by a basket granulator. The resulting granulated product was dried to obtain 100 parts of granules.

Formulation Example 3—Granules (G2)

15 parts of the compound (a) of the present invention, 60 parts of bentonite, 21 parts of talc, 1 part of sodium dodecyl benzene sulfonate, 1 part of polyoxyethylene alkyl aryl ether and 2 parts of sodium lignin sulfonate were mixed. An appropriate amount of water was added therein and was uniformly kneaded and granulated by a basket granulator. The resulting granulated product was dried to obtain 100 parts of granules.

Formulation Example 4—Wettable Powder (W1)

50 parts of the compound (c) of the present invention, 40 parts of calcium carbonate, 5 parts of Sorpol (registered trademark) 5039 (mixture of anionic surfactant and white carbon: manufactured by TOHO Chemical Industry Co., Ltd.) and 5 parts of white carbon were uniformly mixed and pulverized to obtain a wettable powder.

Formulation Example 5—Wettable Powder (W2)

30 parts of the compound (d) of the present invention, 63 parts of kaolinite, 5 parts of Sorpol (registered trademark) 5039 (mixture of anionic surfactant and white carbon: manufactured by TOHO Chemical Industry Co., Ltd.) and 2 parts of white carbon were uniformly mixed and pulverized to obtain a wettable powder.

Formulation Example 6—Emulsifiable Concentrate (EC)

20 parts of the compound (b) of the present invention, 55 parts of xylene, 20 parts of N, N-dimethylformamide and 5 parts of Sorpol (registered trademark) 2680 (surfactant: TOHO Chemical Industry Co., Ltd.) were uniformly mixed to obtain an emulsifiable concentrate.

Formulation Example 7—Flowable Formulation (FL)

5 parts of Sorpol (registered trademark) 3353 (nonionic surfactant: manufactured by TOHO Chemical Industry Co., Ltd.), 5 parts of a 1% aqueous solution of xanthan gum, 40 parts of water and 10 parts of ethylene glycol were uniformly dissolved and 40 parts of the compound (a) of the present invention were added therein and stirred. Then, the resulting mixture was wet-pulverized by a sandmill to obtain the flowable formulation.

Formulation Example 8—Dust (D)

5 parts of the compound (c) of the present invention and 95 parts of clay were uniformly mixed to obtain a dust.

Reference Formulation Example 1

According to Formulation Example 1, simplified emulsifiable concentrate E(e), simplified emulsifiable concentrate E(f), simplified emulsifiable concentrate E(g), simplified emulsifiable concentrate E(h) and simplified emulsifiable concentrate E(i) were each obtained by using the comparative compound (e), the compound (f), the comparative compound (g), the comparative compound (h), and the comparative compound (i) in place of the compound (a).

Test Example 1—Control Test on Chinese Cabbage Soft Rot (Spray Test)

Chinese cabbage (cultivar: Musou) planted in a plastic pot having a diameter of 5 cm was grown up to 2- or 3-leaf stage in a greenhouse. The simplified emulsifiable concentrates E(a) to E(h) containing the compounds (a) to (d) or the comparative compounds (e) to (h) produced in Formulation Example 1 were respectively suspended to be a predetermined concentration in distilled water containing 0.03% of Gramin (registered trademark) S (manufactured by Mitsui Chemicals Agro Inc.) as a spreader. The suspensions were sprayed to the test plants, and the sprayed plants were inoculated with soft rot 3 days after spraying.

The inoculation method was as follows; the plants were inoculated by stabbing the leaves with pins dipped in a suspension of soft rot bacteria (*Erwinia carotovora* subsp. *carotovora*). The inoculated plants were put in a greenhouse to promote infection, Thereafter, a control value was calculated by categorizing the degree of infection. For the control effect, a control value less than 20 was evaluated as C (low control effect or no control effect), a control value of 20 or more was evaluated as B (control effect is observed), and a control value of 50 or more was evaluated as A (high control effect is observed). The results were shown in Table 1.

The criteria for the degree of infection were defined as follows.
Degree of infection
0: no infection (lesion area rate of 0%)
1: infection was observed only around the inoculated position but was not progressed.
2: lesion progressed around the inoculated position was observed.
3: lesion progressed around the inoculated position was observed and was further spread through the vascular bundle.

The control value was calculated from the following equation.

Control value=(1−degree of infection of treated plot/degree of infection of untreated plot)×100

TABLE 1

| Test type | Chemical agent | Concentration (ppm) | Result |
|---|---|---|---|
| Example | Tolprocarb (a) | 50 | B |
| Example | Pyroquilon (b) | 50 | B |
| Example | Tricyclazole (c) | 50 | A |
| Example | Fthalide (d) | 50 | B |
| Comparative Example | Carpropamide (e) | 50 | C |

TABLE 1-continued

| Test type | Chemical agent | Concentration (ppm) | Result |
|---|---|---|---|
| Comparative Example | Diclosimette (f) | 50 | C |
| Comparative Example | Fenoxanil (g) | 50 | C |
| Comparative Example | Probenazole (h) | 250 | C |

From the results in Table 1, the compounds (a) to (d) were applied by spraying and exhibited the excellent control effect on Chinese cabbage soft rot. In addition, the compounds (a) to (d) exhibited the control effects higher than those of the comparative compounds (e) to (h) even at concentrations equivalent to or lower than those of the comparative compounds (e) to (h). In addition, phytotoxicity was not observed in the Chinese cabbage plant (cultivar: Musou) by the application of the compounds (a) to (d) and the comparative compounds (e) to (h).

Test Example 2—Control Test on Chinese Cabbage Soft Rot (Soil Drench Test)

Chinese cabbage (cultivar: Musou) planted in a plastic pot having a diameter of 5 cm was grown up to 2- or 3-leaf stage in a greenhouse. The simplified emulsifiable concentrates E(a) to E(c) containing the compounds (a) to (c) and the simplified emulsifiable concentrates E(e) to E(h) containing the comparative compounds (e) to (h), which were produced in Formulation Example 1 or Reference Formulation Example 1, were respectively suspended in distilled water to obtain suspensions. 5 ml of the suspension were drenched to soil where around root of Chinese cabbage 10 days before inoculation. The inoculation method was as follows; the inoculation was performed by stabbing the leaves of treated plants with pins dipped in a suspension of soft rot bacteria (*Erwinia carotovora* subsp. *carotovora*). Thereafter, the inoculated plants were put in a greenhouse to promote infection and the control value was calculated by categorizing the infection based on the degree. For the control effect, a control value less than 20 was evaluated as C (low control effect or no control effect), a control value of 20 or more was evaluated as B (control effect is observed), and a control value of 50 or more was evaluated as A (high control effect was observed). The results were shown in Table 2.

The criteria for the degree of infection were as follows.
Degree of infection 0: no infection (lesion area rate of 0%), 1: infection was observed only around the inoculation position but was not progressed, 2: lesion progressed around the inoculation position was observed, 3: lesion progressed around the inoculation position was observed and is further spread through the vascular bundle.

The control value was calculated from the following equation.

Control value=(1−degree of infection of treated plot/ degree of infection of untreated plot)×100

TABLE 2

| Test type | Chemical agent | Concentration (g ai/10a) | Result |
|---|---|---|---|
| Example | Tolprocarb (a) | 22.5 | B |
| Example |  | 45 | B |
| Example | Pyroquilon (b) | 22.5 | B |
| Example |  | 45 | A |
| Example | Tricyclazole (c) | 22.5 | C |
| Example |  | 45 | B |

TABLE 2-continued

| Test type | Chemical agent | Concentration (g ai/10a) | Result |
|---|---|---|---|
| Comparative Example | Carpropamide (e) | 22.5 | C |
| Comparative Example |  | 45 | B |
| Comparative Example | Diclosimette (f) | 22.5 | B |
| Comparative Example |  | 45 | B |
| Comparative Example | Fenoxanil (g) | 22.5 | A |
| Comparative Example |  | 45 | B |
| Comparative Example | Probenazole (h) | 250 | B |

From the results in Table 2, the compounds (a) to (c) were applied by soil drench and exhibited the excellent control effect on Chinese cabbage soft rot. In addition, the compounds (a) to (c) exhibited the control effects higher than those of the comparative compounds (e) to (h) even at concentrations equivalent to or lower than those of the comparative compounds (e) to (h). In addition, phytotoxicity was not observed in the Chinese cabbage plant (cultivar: Musou) by the application of the compounds (a) to (c) and the comparative compounds (e) to (h).

Test Example 3—Control Test on Cabbage Black Rot (Soil Drench Test)

Cabbage (cultivar: Shikidori) planted in a plastic pot having a diameter of 5 cm was grown up to 2- or 3-leaf stage in a greenhouse. The simplified emulsifiable concentrates E(a) to E(c) and E(h) containing the compounds (a) to (c) or the comparative compound (h) produced in Formulation Example 1 or Reference Formulation Example 1 were respectively suspended in distilled water to obtain suspensions. 5 ml of the suspension were drenched to soil where around root of cabbage 10 days before inoculation. The inoculation method was as follows; cabbage black rot suspension (*Xanthomonas campestris* pv. *campestris*) was inoculated onto cabbage leaves by spraying. Thereafter, the inoculated plats were put in a greenhouse to promote infection and the control value was calculated by categorizing the infection by the degree. The control effect was determined from a practical use based on control value. A control value of less than 20 was evaluated as C (low control effect or no control effect), a control value of 20 or more was evaluated as B (control effect was observed), and a control value of 50 or more was evaluated as A (high control effect was observed). The results were shown in Table 3.

The criteria for the degree of infection were as follows.
Degree of Infection
0: no infection (lesion area rate of 0%)
1: infection was observed only in a leaf margin but not progressed.
2: pathologic punctum progressed along a leaf bundle from a leaf margin.
3: 50% or more of a leaf area was diseased or dead.

The control value was calculated from the following equation.

Control value=(1−degree of infection of treated plot/ degree of infection of untreated plot)×100

TABLE 3

| Test type | Chemical agent | Concentration (g ai/10a) | Result |
|---|---|---|---|
| Example | Tolprocarb (a) | 22.5 | B |
| Example |  | 45 | B |

TABLE 3-continued

| Test type | Chemical agent | Concentration (g ai/10a) | Result |
|---|---|---|---|
| Example | Pyroquilon (b) | 22.5 | B |
| Example | | 45 | B |
| Example | Tricyclazole (c) | 22.5 | B |
| Example | | 45 | A |
| Comparative Example | Probenazole (h) | 250 | C |

From the results in Table 3, the compounds (a) to (c) were applied by soil drench and exhibited the excellent control effect on cabbage black rot. In addition, the compounds (a) to (c) exhibited the control effects higher than that of the comparative compound (h) even at a lower concentration than that of the comparative compound (h). In addition, phytotoxicity was not observed in the plant cabbage (cultivar: Shikidori) by the application of the compounds (a) to (c) and the comparative compound (h).

Test Example 4—Control Test on Cucumber Leaf Spot Bacterial Diseases (Spray Test)

Cucumber (cultivar: Sagami-hanjiro) planted in a plastic pot having a diameter of 5 cm was grown up to 1- to 2-leaf stage in a greenhouse. The simplified emulsifiable concentrates E(a) to E(h) containing the compounds (a) to (d) or the comparative compounds (e) to (h) produced in Formulation Example 1 or Reference Formulation Example 1 were respectively suspended to be a predetermined concentration in distilled water containing 0.03% of Gramin (registered trademark) S (manufactured by Mitsui Chemicals Agro Inc.) as a spreader to obtain suspensions. The suspensions were sprayed to the test plants, and the plants were inoculated by spraying a suspension of cucumber leaf spot bacteria (*Pseudomonas syringae* pv. *lachrymans*) 3 days after chemical treatment. Thereafter, the plants were put in a greenhouse to promote infection, and the control value was calculated by categorizing the infection by the degree. The control effect was determined from a practical use based on control value. A control value of less than 20 was evaluated as C (low control effect or no control effect), a control value of 20 or more was evaluated as B (control effect is observed), and a control value of 50 or more was evaluated as A (high control effect is observed). The results were shown in Table 4.

The criteria for the degree of infection were as follows.
Degree of Infection
0: no infection (lesion area rate of 0%)
1: lesion area rate of 1 to 24%
2: lesion area rate of 25 to 49%
3: lesion area rate of 50% or more.
The control value was calculated from the following equation.

Control value=(1−degree of infection of treated plot/degree of infection of untreated plot)×100

TABLE 4

| Test type | Chemical agent | Concentration (ppm) | Result |
|---|---|---|---|
| Example | Tolprocarb (a) | 50 | A |
| Example | | 250 | A |
| Example | Pyroquilon (b) | 50 | A |
| Example | | 250 | A |
| Example | Tricyclazole (c) | 50 | A |
| Example | | 250 | A |
| Example | Fthalide (d) | 50 | A |
| Example | | 250 | A |
| Comparative Example | Carpropamide (e) | 250 | A |
| Comparative Example | Diclosimette (f) | 250 | A |
| Comparative Example | Fenoxanil (g) | 250 | A |
| Comparative Example | Probenazole (h) | 250 | A |

From the results in Table 4, the compounds (a) to (d) were applied by spraying and exhibited the excellent control effect on cucumber leaf spot bacterial diseases. In addition, the compounds (a) to (d) exhibited the high control effects even at lower concentration than the comparative compounds (e) to (h). In addition, phytotoxicity was not observed in the cucumber (cultivar: Sagami-hanjiro) by the application of the compounds (a) to (d) and the comparative compounds (e) to (h).

Test Example 5—Control Test on Cucumber Leaf Spot Bacterial Diseases (Soil Drench Test)

Cucumber (cultivar: Sagami-hanjiro) planted in a plastic pot having a diameter of 5 cm was grown up to 1- to 2-leaf stage in a greenhouse. The simplified emulsifiable concentrate E(a) to E(c) and E(e) to (h) containing the compounds (a) to (c) or the comparative compound (h) produced in Formulation Example 1 or Reference Formulation Example 1 were respectively suspended in distilled water to obtain suspensions. 5 ml of the suspension were drenched to soil where around root of cucumber 10 days before inoculation. The inoculation method was as follows; the plants were inoculated by spraying a suspension of cucumber leaf spot bacteria (*Pseudomonas syringae* pv.; *lachrymans*). Thereafter, the inoculated plants were put in a greenhouse to promote infection, and the control value was calculated by categorizing the infection by the degree. For the control effect, a control value less than 20 was evaluated as C (low control effect or no control effect), a control value of 20 or more was evaluated as B (control effect was observed), and a control value of 50 or more was evaluated as A (high control effect was observed). The results are shown in Table 5.

The criteria for the degree of infection were as follows.
Degree of Infection
0: no infection (lesion area rate of 0%)
1: lesion area rate of 1 to 24%
2: lesion area rate of 25 to 49%
3: lesion area rate of 50% or more
The control value was calculated from the following equation.

Control value=(1−degree of infection of treated plot/degree of infection of untreated plot)×100

TABLE 5

| Test type | Chemical agent | Concentration (g ai/10a) | Result |
|---|---|---|---|
| Example | Tolprocarb (a) | 180 | B |
| Example | Pyroquilon (b) | 180 | A |
| Example | Tricyclazole (c) | 180 | A |
| Comparative Example | Probenazole (h) | 250 | A |

From the results in Table 5, the compounds (a) to (c) were applied by soil drench and exhibited the excellent control effect on cucumber leaf spot bacterial diseases. In addition, the compounds (a) to (c) exhibited the high control effects even at lower concentration than the comparative compound (h). In addition, phytotoxicity was not observed in the cucumber (cultivar: Sagami-hanjiro) by the application of the compounds (a) to (c) and the comparative compound (h).

Test Example 6—Control Test on Cucumber Powdery Mildew (Spray Test)

Cucumber (cultivar: Sagami-hanjiro) planted in a plastic pot having a diameter of 5 cm was grown up to 1-leaf stage in a greenhouse. The simplified emulsifiable concentrates E(a) to E(h) containing the compounds (a) to (d) or the comparative compounds (e) to (h) produced in Formulation Example 1 or Reference Formulation Example 1 were respectively suspended to be a predetermined concentration in distilled water containing 0.03% of Gramin (registered trademark) S (manufactured by Mitsui Chemicals Agro Inc.) as a spreader to obtain suspensions. The suspensions were sprayed to the test plants, and then the plants were inoculated on the same day after leaves were dried. The inoculation method was as follows; the plants were inoculated by spraying a spore suspension of cucumber powdery mildew (*Sphaerotheca cucurbitae*). Thereafter, the inoculated plants were put in a greenhouse to promote infection, and a control value was calculated by categorizing the degree of infection. For the control effect, a control value less than 20 was evaluated as C (low control effect or no control effect), a control value of 20 or more was evaluated as B (control effect is observed), and a control value of 50 or more was evaluated as A (high control effect was observed). The results were shown in Table 6.

The criteria for the degree of infection were as follows.
Degree of Infection
0: no infection (lesion area rate of 0%)
1: lesion area rate of 1 to 24%
2: lesion area rate of 25 to 49%
3: lesion area rate of 50% or more
The control value was calculated from the following equation.

Control value=(1−degree of infection of treated plot/degree of infection of untreated plot)×100

TABLE 6

| Test type | Chemical agent | Concentration (ppm) | Result |
| --- | --- | --- | --- |
| Example | Tolprocarb (a) | 50 | B |
| Example | Pyroquilon (b) | 50 | B |
| Example | Tricyclazole (c) | 50 | A |
| Example | Fthalide (d) | 50 | B |
| Comparative Example | Carpropamide (e) | 250 | B |
| Comparative Example | Diclocymet(f) | 250 | B |
| Comparative Example | Fenoxanil(g) | 250 | A |
| Comparative Example | Probenazole (h) | 250 | A |

From the results in Table 6, the compounds (a) to (d) were applied by spraying and exhibited the excellent control effect on cucumber powdery mildew. In addition, the compounds (a) to (d) exhibited the high control effects even at lower concentration than the comparative compounds (e) to (h). In addition, phytotoxicity was not observed in the cucumber (cultivar: Sagami-hanjiro) by the application of the compounds (a) to (d) and the comparative compounds (e) to (h).

Test Example 7—Control Test on Cucumber Powdery Mildew (Spray Test)

Cucumber (cultivar: Sagami-hanjiro) planted in a plastic pot having a diameter of 5 cm was grown up to 1-leaf stage in a greenhouse. The simplified emulsifiable concentrates E(a) to E(d) and E(h) containing the compounds (a) to (d) or the comparative compound (h) produced in Formulation Example 1 or Reference Formulation Example 1 were respectively suspended to be a predetermined concentration in distilled water containing 0.03% of Gramin (registered trademark) S (manufactured by Mitsui Chemicals Agro Inc.) as a spreader to obtain suspensions. The suspensions were sprayed to the test plants, and then the test plants were inoculated on the same day after leaves were dried. The inoculation method was as follows; the plants were inoculated by spraying a spore suspension of cucumber powdery mildew (*Pseudoperonospora cubensis*). Thereafter, the inoculated plants were put in a greenhouse to promote infection, and a control value was calculated by categorizing the degree of infection. For the control effect, a control value less than 20 was evaluated as C (low control effect or no control effect), a control value of 20 or more was evaluated as B (control effect is observed), and a control value of 50 or more was evaluated as A (high control effect was observed). The results were shown in Table 7.

The criteria for the degree of infection were as follows.
Degree of Infection
0: no infection (lesion area rate of 0%)
1: lesion area rate of 1 to 24%
2: lesion area rate of 25 to 49%
3: lesion area rate of 50% or more
The control value was calculated from the following equation.

Control value=(1−degree of infection of treated plot/degree of infection of untreated plot)×100

TABLE 7

| Test type | Chemical agent | Concentration (ppm) | Result |
| --- | --- | --- | --- |
| Example | Tolprocarb (a) | 250 | B |
| Example | Pyroquilon (b) | 250 | B |
| Example | Tricyclazole (c) | 250 | B |
| Example | Fthalide (d) | 250 | B |
| Comparative Example | Probenazole (h) | 250 | B |

From the results in Table 7, the compounds (a) to (d) were applied by spraying and exhibited the excellent control effect on cucumber powdery mildew. In addition, phytotoxicity was not observed in the cucumber (cultivar: Sagami-hanjiro) by the application of the compounds (a) to (d) and the comparative compound (h).

Test Example 8—Control Test on Tomato Powdery Mildew (Soil Incorporation Test)

A tomato powdery mildew control test was performed in a greenhouse. A plastic pots having a diameter of 20 cm were used for the test. As test chemical agents, granules containing 3% of tolprocarb (compound (a)) (trade name; Sanblas (registered trademark) granules (Mitsui Chemical Agro Inc.)) commercially available and granules containing 5% of pyroquilon (compound (b)) (trade name: Coratop (registered trademark) granules (manufactured by Syngenta Japan Co., Ltd.)) were mixed to soil on the entire surface of the pot in an amount equivalent to 3 kg/10a. Also, the simplified emulsifiable concentrate E(c) containing the compound (c) was suspended in the distilled water, and was irrigated onto the entire surface of the pot to be incorporated. As the comparative example, granules (trade name: Oryzemate (registered trademark) granules (Meiji Seika Pharma Co., Ltd.)) containing 8% of probenazole (comparative compound (h)) was mixed to soil on the entire surface of the pot in an amount equivalent to 3 kg/10a. Tomato (cultivar: Ohgata-fukuju) grown up to 4-leaf stage of true leaf was planted in a plastic pots having a diameter of 20 cm and were treated with chemical agents. Plants were grown in a glass greenhouse and naturally occurring tomato powdery mildew (*Oidium neolycopersici*) was examined one month after chemical agent treatment. In the examination, an infection index of six leaves per pot was examined to calculate disease severity index. The control value was calculated from the disease severity index. The results were shown in Table 8.

The criteria for the degree of infection are as follows.
Infection Index
0: no infection (lesion area rate of 0%)
1: lesion area rate of less than 5%
2: lesion area rate from 5% to 25%
3: lesion area rate from 25% to 50%
4: lesion area rate of 50% or more The severity index was calculated from the following equation.

Severity index=((the number of compound leaves of infection index 0×0)+(the number of compound leaves of infection index 1×1)+(the number of compound leaves of infection index 2×2)+(the number of compound leaves of infection index 3×3)+(the number of compound leaves of infection index 4×4/(the number of compound leaves examined×4))×100

The control value was calculated from the following equation.

Control value=(1−degree of infection of treated plot/degree of infection of untreated plot)×100

TABLE 8

| Chemical Agent | g ai/ 10a | plot | Number of Checked Leaves | Infection index 0 | 1 | 2 | 3 | 4 | Disease severity index | Control value | Phytotoxicity |
|---|---|---|---|---|---|---|---|---|---|---|---|
| Whole Soil Incorporation of Granules containing 3% of Tolprocarb (a) | 90 | I | 6 | 2 | 3 | 1 | 0 | 0 | | | |
| | | II | 6 | 2 | 4 | 0 | 0 | 0 | | | |
| | | III | 6 | 3 | 2 | 1 | 0 | 0 | | | |
| | | Total | 18 | 7 | 9 | 2 | 0 | 0 | 18.1 | 63.9 | — |
| Whole Soil Incorporation of Granules containing 5% of Pyroquilon (b) | 150 | I | 6 | 4 | 1 | 1 | 0 | 0 | | | |
| | | II | 6 | 3 | 3 | 0 | 0 | 0 | | | |
| | | III | 6 | 4 | 2 | 0 | 0 | 0 | | | |
| | | Total | 18 | 11 | 6 | 1 | 0 | 0 | 11.1 | 77.8 | — |
| Whole Soil Incorporation of Tricyclazole (c) | 90 | I | 6 | 0 | 5 | 1 | 0 | 0 | | | |
| | | II | 6 | 5 | 1 | 0 | 0 | 0 | | | |
| | | III | 6 | 3 | 2 | 1 | 0 | 0 | | | |
| | | Total | 18 | 8 | 8 | 2 | 0 | 0 | 16.7 | 66.7 | — |
| Whole Soil Incorporation of Granules containing 8% of probenazole (h) | 240 | I | 6 | 1 | 4 | 1 | 0 | 0 | | | |
| | | II | 6 | 2 | 3 | 1 | 0 | 0 | | | |
| | | III | 6 | 6 | 0 | 0 | 0 | 0 | | | |
| | | Total | 18 | 9 | 7 | 2 | 0 | 0 | 15.3 | 69.4 | — |
| No treatment | | I | 6 | 0 | 1 | 2 | 2 | 1 | | | |
| | | II | 6 | 0 | 1 | 3 | 2 | 0 | | | |
| | | III | 6 | 0 | 5 | 0 | 1 | 0 | | | |
| | | Total | 18 | 0 | 7 | 5 | 5 | 1 | 50.0 | — | |

From the results in Table 8, granules containing 3% of the compound (a), granules containing 5% of the compound (b) and the compound (c) were applied by the whole soil incorporation and exhibited the excellent control effect in lower compound content than granules containing 8% of the comparative compound (h) which is a comparative chemical agent. From the application of granules containing 3% of the compound (a), granules containing 5% of the compound (b), the compound (c) and granules containing 8% of the comparative compound (h), phytotoxicity was not observed in plant tomato (cultivar: Ohgata-fukuju).

Test Example 9—Control Test on Cabbage Soft Rot (Field Test)

In a greenhouse, cabbage seedlings (cultivar: Kinkei No. 201) grown in a cell tray were grown to 3-true leaf stage, and planted in a greenhouse whose floor surface was soil. At the time of the planting, granules containing 3% of tolprocarb (compound (a)) (trade name; Sanblas (registered trademark) granules (manufactured by Mitsui Chemicals Agro Inc.)), granules containing 5% of pyroquilon (compound (b)) (trade name; Coratop (registered trademark) granules (manufactured by Syngenta Japan Ltd.)) and granules containing 8% of probenazole (comparative compound (h)) (trade name: Oryzemate (registered trademark) granules (manufactured by Meiji Seika Pharma Co., Ltd.) were each treated with planting hole so as to be 3 kg/10a, 3 kg/10a, and 6 kg/10a. After growing to a heading stage in a greenhouse field, soft rot was inoculated by spraying a suspension of soft rot bacteria (*Erwinia carotovora* subsp. *carotovora*). After the lesion was sufficiently progressed, the control effect was examined. In the examination, the infection index was examined for each plant, and the disease severity index was calculated. The control value was calculated from the disease severity index. The results were shown in Table 9.

The criteria for the degree of infection were as follows.
Infection Index
0: no infection
1: infection in only a part of outer leaf (marketable)
2: infection in a part of outer leaf and head leaf (which had damaged parts removed, could be marketable as a small head, but was B class product)
3: most of the head leaves were diseased or had more damaged parts (not marketable).

The severity index was calculated from the following equation.

Severity index=((the number of plants of infection index 0×0)+(the number of stubbles of infection index 1×1)+(the number of plants of infection index 2×2)+(the number of plants of infection index 3×3)/(the number of plants examined×3)×100

The control value was calculated from the following equation.

Control value=(1−severity index of treated plot/severity index of untreated plot)×100

Test Example 10—Control Test on Cucumber Leaf Spot Bacterial Diseases (Field Test)

Cucumber (cultivar: Sagami-hanjiro) planted in a plastic pot having a diameter of 5 cm was grown up to 2-leaf stage of true leaf in a greenhouse, and planted in an open field. At the time of the planting, granules containing 3% of tolprocarb (compound (a)) (trade name; Sanblas (registered trademark) granules (manufactured by Mitsui Chemicals Agro Inc.)), granules containing 5% of pyroquilon (compound (b)) (trade name; Coratop (registered trademark) granules (manufactured by Syngenta Japan Ltd.)) and granules containing 8% of probenazole (comparative compound (h)) (trade name: Oryzemate (registered trademark) granules (manufactured by Meiji Seika Pharma Co., Ltd.) were each treated with planting hole so as to be 6 kg/10a, 6 kg/10a, and 7.5 kg/10a. After growing for about 3 weeks, the lower leaves of cucumber were inoculated by spraying a suspension of cucumber leaf spot bacteria (*Pseudomonas syringae* pv. *lachrymans*). After the lesion was sufficiently progressed, the control effect was examined. In the examination, the infection index was examined, the disease severity index was calculated, and the control value was calculated from the disease severity index. The results were shown in Table 10.

TABLE 9

| Chemical Agent | Treatment amount | plot | Number of Checked Plants | Infection index 0 | 1 | 2 | 3 | Frequency of Infected Plant (%) | Disease Severity Index | Control Value (severity) | Phytotoxicity |
|---|---|---|---|---|---|---|---|---|---|---|---|
| Granules containing 3% of tolprocarb (a) treated with planting hole at the time of | 3 kg/10a | I | 6 | 3 | 1 | 1 | 1 | | | | |
| | | II | 6 | 2 | 1 | 3 | 0 | | | | |
| | | III | 6 | 6 | 0 | 0 | 0 | | | | |
| planting | | Total | 18 | 11 | 2 | 4 | 1 | 38.9 | 24.1 | 55.8 | — |
| Granules containing 5% of pyroquilon (b) treated with planting hole at the time of | 3 kg/10a | I | 6 | 2 | 1 | 1 | 2 | | | | |
| | | II | 6 | 5 | 0 | 1 | 0 | | | | |
| | | III | 6 | 4 | 1 | 1 | 0 | | | | |
| planting | | Total | 18 | 11 | 2 | 3 | 2 | 38.9 | 25.9 | 52.4 | — |
| Granules containing 8% of probenazole (h) treated with planting hole at the time of | 6 kg/10a | I | 6 | 1 | 1 | 1 | 3 | | | | |
| | | II | 6 | 6 | 0 | 0 | 0 | | | | |
| | | III | 6 | 3 | 0 | 2 | 1 | | | | |
| planting | | Total | 18 | 10 | 1 | 3 | 4 | 44.4 | 35.2 | 35.4 | — |
| No treatment | | I | 6 | 1 | 0 | 1 | 4 | | | | |
| | | II | 6 | 1 | 3 | 2 | 0 | | | | |
| | | III | 6 | 1 | 5 | 0 | 0 | | | | |
| | | IV | 23 | 6 | 1 | 8 | 8 | | | | |
| | | Total | 41 | 9 | 9 | 11 | 12 | 78.0 | 54.5 | — | |

From the results in Table 9, granules containing 3% of the compound (a) and granules containing 5% of the compound (b) exhibited the excellent control effect by performing the planting hole treatment on the cabbage soft rot. Furthermore, those granules exhibited the more excellent control effect than granules containing 8% of the comparative compound (h) even at the treatment amount smaller than granules containing 8% of the comparative compound (h). From the application of granules containing 3% of the compound (a), granules containing 5% of the compound (b) and granules containing 8% of the comparative compound (h), phytotoxicity was not observed in plant cabbage (cultivar: Kinkei No. 201).

The criteria for the degree of infection were as follows.
Infection Index
0: No infected leaf in the examined plants
1: infected leaf rate in the examined plants of less than 5%
2: infected leaf rate in the examined plants 5% to 25%
3: infected leaf rate in the examined plants of 26% to 49%
4: infected leaf rate in the examined plants of 50% or more The severity index was calculated from the following equation.

Severity index=((the number of leaves of infection index 0×0)+(the number of leaves of infection index 1×1)+(the number of leaves of infection index 2×2)+(the number of leaves of infection index 3×3)+(the number of leaves of infection index 4×4/(the number of leaves examined×4))×100

The control value was calculated from the following equation.

Control value=(1−severity index of treated plot/severity index of untreated plot)×100 more was evaluated as A (high control effect was observed). The results were shown in Table 11.

The control value was calculated from the following equation.

TABLE 10

| Chemical Agent | Treatment amount | plot | Number of Checked Plants | Infection Index 0 | 1 | 2 | 3 | 4 | Frequency of Infected Plant (%) | Disease Severity Index | Control Value (severity) | Phytotoxicity |
|---|---|---|---|---|---|---|---|---|---|---|---|---|
| Granules containing 3% of tolprocarb (a) treated with planting hole at the time of planting | 6 kg/10a | I | 6 | 5 | 1 | 0 | 0 | 0 | | | | |
| | | II | 6 | 5 | 1 | 0 | 0 | 0 | | | | |
| | | III | 5 | 4 | 1 | 0 | 0 | 0 | | | | |
| | | Total | 17 | 14 | 3 | 0 | 0 | 0 | 17.6 | 4.4 | 65.8 | — |
| Granules containing 5% of pyroquilon (b) treated with planting hole at the time of planting | 6 kg/10a | I | 6 | 6 | 0 | 0 | 0 | 0 | | | | |
| | | II | 5 | 2 | 3 | 0 | 0 | 0 | | | | |
| | | III | 6 | 6 | 0 | 0 | 0 | 0 | | | | |
| | | Total | 17 | 14 | 3 | 0 | 0 | 0 | 17.6 | 4.4 | 65.8 | — |
| Granules containing 8% of probenazole (h) treated with planting hole at the time of planting | 7.5 kg/10a | I | 6 | 6 | 0 | 0 | 0 | 0 | | | | |
| | | II | 6 | 5 | 0 | 1 | 0 | 0 | | | | |
| | | III | 6 | 6 | 0 | 0 | 0 | 0 | | | | |
| | | Total | 18 | 17 | 0 | 1 | 0 | 0 | 5.6 | 2.8 | 78.5 | — |
| No treatment | | I | 6 | 5 | 1 | 0 | 0 | 0 | | | | |
| | | II | 6 | 5 | 0 | 1 | 0 | 0 | | | | |
| | | III | 6 | 6 | 0 | 0 | 0 | 0 | | | | |
| | | IV | 6 | 6 | 0 | 0 | 0 | 0 | | | | |
| | | V | 6 | 2 | 1 | 1 | 0 | 2 | | | | |
| | | VI | 6 | 6 | 0 | 0 | 0 | 0 | | | | |
| | | VII | 26 | 14 | 7 | 4 | 1 | 0 | | | | |
| | | Total | 62 | 44 | 9 | 5 | 1 | 2 | 29.0 | 12.9 | — | |

From the results in Table 10, granules containing 3% of the compound (a) and granules containing 5% of the compound (b) exhibited the excellent control effect by performing the planting hole treatment on the cucumber leaf spot bacterial diseases. Furthermore, those granules exhibited almost the same control effect even at the treatment amount smaller than that of granules containing 8% of the comparative compound (h). From the application of granules containing 3% of the compound (a), granules containing 5% of the compound (b) and granules containing 8% of the comparative compound (h), phytotoxicity was not observed in cucumber (cultivar: Sagami-hanjiro).

Test Example 11—Control Test on Bacterial Leaf Blight of Rice (Soil Drench Test)

Rice (cultivar: Sachikaze) planted in a plastic pot having a diameter of 5 cm was grown up to 3-true leaf stage in a greenhouse. The simplified emulsifiable concentrates E(a) to E(h) containing the compounds (a) to (d) or the comparative compounds (e) to (h) produced in Formulation Example 1 or Reference Formulation Example 1 were respectively suspended in distilled water to obtain suspensions. 5 ml of the suspensions were drenched in soil where around rice root 10 days before inoculation. The inoculation method was as follows; the plants were inoculated by cutting off the tip of rice leaves with scissors dipped in a suspension of rice leaf blight bacteria (*Xanthomonas oryzae* pv. *oryzae*) (leaf-clipping inoculation). Thereafter, the inoculated plants were put in a greenhouse to promote infection, and the control value was calculated by examining a whitening length from the tip of the cut rice leaf. For the control effect, a control value less than 20 was evaluated as C (low control effect or no control effect), a control value of 20 or more was evaluated as B (control effect was observed), and a control value of 50 or Control value=(1−average whitening length of treated plot/average whitening length of untreated plot)×100

TABLE 11

| Test type | Chemical agent | Concentration (g ai/10a) | Result |
|---|---|---|---|
| Example | Tolprocarb (a) | 90 | B |
| Example | | 180 | A |
| Example | Pyroquilon (b) | 90 | B |
| Example | | 180 | A |
| Example | Tricyclazole (c) | 180 | B |
| Example | Fthalide (d) | 180 | B |
| Comparative Example | Carpropamide (e) | 90 | B |
| Comparative Example | | 180 | B |
| Comparative Example | Diclocymet (f) | 90 | B |
| Comparative Example | | 180 | A |
| Comparative Example | Fenoxanil (g) | 90 | A |
| Comparative Example | | 180 | A |
| Comparative Example | Probenazole (h) | 250 | A |

From the results in Table 11, the compounds (a) to (d) were applied by soil drench treatment and exhibited the excellent control effect on bacterial leaf blight of rice. In addition, phytotoxicity was not observed in the plant rice (cultivar: Sachikaze) by the application of the compounds (a) to (d) and the comparative compounds (e) to (h).

Test Example 12—Control Test on Bacterial Leaf Blight of Rice (Field Test)

Granules containing 4% of tolprocarb (compound (a)), 6% of dinotefuran (insecticidal component) and 0.75% of chlorantraniliprole (insecticidal component) (trade name; Suntriple (registered trademark) nursery box granules (manufactured by Mitsui Chemical Agro Co., Ltd.)), which were commercially available formulations, and granules containing 24% of probenazole (comparative compound (h)) and 1% of fipronil (insecticidal component) (trade name; Dr. Oryze (registered trademark) Prince (registered trademark) granules 10 (manufactured by Meiji Seika Pharma Co., Ltd.)), which were commercially available formulations, were treated at a ratio of 50 g/box to rice seedlings (cultivar: Hinohikari) grown in a nursery box based on an conventional method, and the rice seedlings were transplanted to a paddy field on the same day. The inoculation method was as follows: rice seedling inoculated with rice leaf blight bacteria of (*Xanthomonas oryzae* pv. *oryzae*) in advance was transplanted around a test area on the day of transplantation. Thereafter, the cultivation was managemed based on an ordinary procedure, and the examination was carried out about 20 days before harvest. In the examination, the infection was examined for 500 leaves in each area to calculate disease severity index. The control value was calculated from the disease severity index. The results were shown in Table 12.

Infection index
0: the ratio of lesion area/leaf area was 0.
1: the ratio of lesion area/leaf area was 1/4 or less.
2: the ratio of lesion area/leaf area was about 1/2.
3: the ratio of lesion area/leaf area was about 3/4.
4: the ratio of lesion area/leaf area was 7/8 or more.

The disease severity index was calculated from the following equation.

Severity index=((the number of leaves of infection index 0×0)+(the number of leaves of infection index 1×1)+(the number of leaves of infection index 2×2)+(the number of leaves of infection index 3×3)+(the number of leaves of infection index 4×4/(the number of leaves examined×4))×100

The control value was calculated from the following equation.

Control value=(1−severity index of treated plot/severity index of untreated plot)×100

Oryze (registered trademark) Prince (registered trademark) granules 10), phytotoxicity was not observed in rice plants (cultivar: Hinohikari)

Test Example 13—Control Test on Rice Bacterial Palea Browning (Field Test)

Granules containing 9% of tolprocarb (test compound (a)) and 12% of dinotefuran (insecticidal component) (trade name; Hyperkick (registered trademark) nursery box granules (manufactured by Mitsui Chemical Agro Co., Ltd.)) and granules containing 24% of probenazole (comparative compound (h)) and 1% of fipronil (insecticidal component) (trade name; Dr. Oryze (registered trademark) Prince (registered trademark) granules 10 (manufactured by Meiji Seika Pharma Co., Ltd.)), which were commercially available formulations, were treated at a ratio of 50 g/box to rice seedlings (cultivar: Nikomaru) grown in a nursery box based on an conventional method, and the rice seedlings were transplanted to a paddy field on the same day. The cultivation was managemed based on the ordinary procedure, and naturally occurring rice bacterial palea browning was examined about 3 months after transplantation (dough-ripe stage). In the examination, the infection was examined for each panicle to calculate disease severity index. The control value was calculated from the disease severity index. The results were shown in Table 13.

Infection Index
0: no infection was observed.
1: panicle having 5 or less of infected grains
2: panicle having 6 to 15 of infected grains
3: panicle having 16 or more of infected grains The severity index was calculated from the following equation.

Severity index=((the number of panicles of infection index 0×0)+(the number of panicles of infection index 1×1)+(the number of panicles of infection index 2×2)+(the number of panicles of infection index 3×3)/(the number of panicles examined× 3)×100

The control value was calculated from the following equation.

Control value=(1−severity index of treated plot/severity index of untreated plot)×100

TABLE 12

| Chemical Agent | Treatment amount Application Timing | Repetition | Number of Checked Leaves | Infection index 0 | 1 | 2 | 3 | 4 | Frequency of Infected Leaf (%) | Disease Severity index | Control value | Phytotoxicity |
|---|---|---|---|---|---|---|---|---|---|---|---|---|
| Mixed granules containing 4% of tolprocarb (a) | 50 g/box Day of Transplantation | I | 500 | 465 | 35 | 0 | 0 | 0 | 7.0 | 1.75 | | |
| | | II | 500 | 494 | 6 | 0 | 0 | 0 | 1.2 | 0.30 | | |
| | | III | 500 | 480 | 19 | 1 | 0 | 0 | 4.0 | 1.05 | | |
| | | IV | 500 | 479 | 20 | 1 | 0 | 0 | 4.2 | 1.10 | | |
| | | Average | | | | | | | 4.1 | 1.05 | 76.1 | — |
| Mixed granules containing 24% of probenazole (h) | 50 g/box Day of Transplantation | I | 500 | 466 | 33 | 1 | 0 | 0 | 6.8 | 1.75 | | |
| | | II | 500 | 490 | 10 | 0 | 0 | 0 | 2.0 | 0.50 | | |
| | | III | 500 | 478 | 22 | 0 | 0 | 0 | 4.4 | 1.10 | | |
| | | IV | 500 | 483 | 17 | 0 | 0 | 0 | 3.4 | 0.85 | | |
| | | Average | | | | | | | 4.2 | 1.05 | 76.1 | — |
| No treatment | | I | 500 | 411 | 82 | 6 | 1 | 0 | 17.8 | 4.85 | | |
| | | II | 500 | 408 | 87 | 5 | 0 | 0 | 18.4 | 4.85 | | |
| | | III | 500 | 428 | 66 | 6 | 0 | 0 | 14.4 | 3.90 | | |
| | | IV | 500 | 426 | 68 | 6 | 0 | 0 | 14.8 | 4.00 | | |
| | | Average | | | | | | | 16.4 | 4.40 | — | |

From the results in Table 12, mixed granules containing 4% of the compound (a) (Suntriple (registered trademark) nursery box granules) exhibited an excellent control effect on bacterial leaf blight of rice by the treatment on the day of transplantation. From the application of the mixed granules containing 4% of the compound (a) and the mixed granules containing 24% of the comparative compound (h) (Dr.

TABLE 13

| Chemical Agent | Treatment amount Application Timing | Repetition | Number of Checked Leaves | Infection index 0 | 1 | 2 | 3 | Frequency of Infected Leaf (%) | Disease Severity index | Control value | Phytotoxicity |
|---|---|---|---|---|---|---|---|---|---|---|---|
| Mixed granules containing 9% of tolprocarb (a) | 50 g/box Day of Transplantation | I | 415 | 357 | 55 | 3 | 0 | 14.0 | 4.9 | | |
| | | II | 483 | 405 | 73 | 5 | 0 | 16.1 | 5.7 | | |
| | | III | 489 | 408 | 72 | 9 | 0 | 16.6 | 6.1 | | |
| | | Average | 462 | | | | | 15.6 | 5.6 | 51 | — |
| Mixed granules containing 24% of probenazole (h) | 50 g/box Day of Transplantation | I | 427 | 366 | 59 | 2 | 0 | 14.3 | 4.9 | | |
| | | II | 448 | 381 | 64 | 3 | 0 | 15.0 | 5.2 | | |
| | | III | 412 | 341 | 65 | 6 | 0 | 17.2 | 6.2 | | |
| | | Average | 429 | | | | | 15.5 | 5.4 | 53 | — |
| No treatment | | I | 502 | 347 | 146 | 9 | 0 | 30.9 | 10.9 | | |
| | | II | 492 | 330 | 139 | 19 | 4 | 32.9 | 12.8 | | |
| | | III | 486 | 355 | 110 | 18 | 3 | 27.0 | 10.6 | | |
| | | Average | 493 | | | | | 30.3 | 11.4 | | — |

From the results in Table 13, the mixed granules containing 9% of the test compound (a) (Hyperkick (registered trademark) nursery box granules) exhibited an excellent control effect on rice bacterial palea browning (*Erwinia herbicola*) by the treatment on the day of transplantation. From the application of the mixed granules containing 9% of the test compound (a) and the mixed granules containing 24% of the comparative compound (h) (Dr. Oryze (registered trademark) Prince (registered trademark) granules 10), phytotoxicity was not observed in plant rice (cultivar: Nikomaru).

Test Example 14—Control Test on Cucumber Mosaic Virus (CMV) (Soil Drench Test)

Cucumber (cultivar: Sagami-hanjiro) planted in a plastic pot having a diameter of 8 cm was grown up to 2-true leaf stage in a greenhouse. The simplified emulsifiable concentrate E(a) or E(i) containing the compound (a) or the comparative compound (i) produced in Formulation Example 1 or Reference Formulation Example 1 were respectively suspended in distilled water to obtain suspensions. 10 ml of the suspensions were drenched to soil where around root of cucumber 1 day before inoculation. The inoculation method was as follows; cucumber leaves infected with cucumber mosaic virus were ground with a mortar to produce an inoculum. The cucumber leaves were sprinkled with carborundum (manufactured by Nacalai Tesque, Inc.; 600 mesh) and inoculated by stroking the surface with a cotton swab dipped in the inoculum. Thereafter, the inoculated plants were put in the greenhouse to promote infection, and the control effect was examined after the infection. The number of infected plants was examined by the degree of infection, and the disease severity index was calculated based on the degree of infection. The control value was calculated from the disease severity index. The results were shown in Table 14.

The criteria for the degree of infection are as follows.
The Degree of Infection
0: no infection
1: infection (mosaic symptom)
2: infection (acute wilt)

Severity index=((the number of plants of degree of infection 0×0)+(the number of plants of degree of infection 1×1)+(the number of plants of degree of infection 2×2)/(the number of plants examined×2))×100

The control value was calculated from the following equation.

Control value=(1−degree of infection of treated plot/degree of infection of untreated plot)×100

TABLE 14

| Chemical agent | Treatment amount (g ai/10a) | Number of Checked Leaves | Number of CMV Infected Leaves | | | Disease Severity index | Control value |
|---|---|---|---|---|---|---|---|
| | | | No Infection | Mosaic | Acute wilt | | |
| Tolprocarb (a) | 22.5 | 3 | 2 | 0 | 1 | 33.3 | 66.7 |
| | 45 | 3 | 0 | 1 | 2 | 83.3 | 16.7 |
| | 90 | 3 | 1 | 1 | 1 | 50.0 | 50.0 |
| Acibenzolar-S-methyl (i) | 250 | 3 | 0 | 3 | 0 | 50.0 | 50.0 |
| No treatment | | 3 | 0 | 0 | 3 | 100.0 | — |

From the results in Table 14, the test compound (a) exhibited the excellent control effect on cucumber mosaic virus (CMV) by the treatment on 1 day before inoculation. In addition, the compound (a) exhibited the high control effects even at lower concentration than the comparative compound (i). In addition, phytotoxicity was not observed in the cucumber (cultivar: Sagami-hanjiro) by the application of the compound (a) and the comparative compound (i).

Test Example 15—Control Test on Cucumber Mosaic Virus (CMV) (Soil Drench Test)

Cucumber (cultivar: Sagami-hanjiro) planted in a plastic pot having a diameter of 8 cm was grown up to 2-true leaf stage in a greenhouse. The simplified emulsifiable concentrate E(a) or E(b) containing the compound (a) or (b) produced in Formulation Example 1 or Reference Formulation Example 1 was respectively suspended or mixed with other compounds and suspended in distilled water to obtain suspensions. 10 ml of the suspensions were drenched to soil where around root of cucumber 3 days before inoculation. The inoculation method was as follows; cucumber leaves infected with cucumber mosaic virus were ground with a mortar to produce an inoculum. The cucumber leaves were sprinkled with carborundum (manufactured by Nacalai Tesque, Inc.; 600 mesh) and inoculated by stroking the surface with a cotton swab dipped in the inoculum. Thereafter, the inoculated plants were put in the greenhouse to promote infection, and the control effect was examined after the infection. The number of infected plants was examined by the degree of infection, and the disease severity index was calculated based on the degree of infection. The control value was calculated from the disease severity index. The results were shown in Table 15.

Infection Index
0: no infection
1: infection (mosaic symptom)
2: infection (acute wilt)

Severity index=((the number of plants of infection index 0×0)+(the number of plants of infection index 1×1)+(the number of plants of infection index 2×2)/(the number of plants examined× 2))×100

The control value was calculated from the following equation.

Control value=(1−degree of infection of treated plot/ degree of infection of untreated plot)×100

The synergistic effect was calculated from the following Colby's equation.

Synergistic effect (expected value)=(control value of compound A+control value of compound B)− (control value of compound A×control value of compound B)/100

When the control value exceeded the expected value in the case of mixing the compounds and applying the mixed product, it was determined that there was a synergistic effect.

tion of the test compounds (a) and (b), dinotefran, thiamethoxam and the comparative compound (h).

Test Example 16—Control Test on Tomato Yellow Leaf Curl Disease (TYLCV) (Soil Drench Test)

Tomato (cultivar: Sekai-ichi) planted in a plastic pot having a diameter of 9 cm was grown up to 4-true leaf stage in a greenhouse. Granules containing 3% of tolprocarb (a) (trade name; Sanblas (registered trademark) granules (manufactured by Mitsui Chemical Agro Co., Ltd.)), granules containing 5% of pyroquilon (b) (trade name; Coratop (registered trademark) granules (manufactured by Syngenta Japan Ltd.)) and granules containing 1% of dinotefran (trade name; Starkle (registered trademark) granules (manufactured by Mitsui Chemicals Agro Co., Ltd.)) were respectively treated or were treated in combination to plant foot of tomato in a predetermined amount. Seven days after chemical agent treatment, the plants were inoculated by sucking of one adult of TYLCV-carrying tobacco whitefly biotype Q per plant for 3 days. Thereafter, the inoculated plants were put in the greenhouse to promote infection, and the control effect was examined after the infection. The infection was examined by the degree of infection, and the disease severity index was calculated based on the degree of infection. The control value was calculated from the disease severity index. The results are shown in Table 16.

Infection Index
0: no infection
1: observation of initial infection (delayed infection)
2: observation of infection Severity index=((the number of plants of infection index 0×0)+(the number of plants of infection index 1×1)+(the number of plants of infection index 2×2)/(the number of plants examined× 2))×100

The control value was calculated from the following equation.

Control value=(1−degree of infection of treated plot/ degree of infection of untreated plot)×100

TABLE 15

| Chemical agent | Treatment amount (g ai/10a) | Number of Checked Plants | Number of CMV Infected Plants | | | Disease Severity index | Control value | Expected Value |
|---|---|---|---|---|---|---|---|---|
| | | | No Infection | Mosaic | Acute wilt | | | |
| Tolprocarb (a) | 90 | 5 | 2 | 3 | 0 | 30.0 | 66.7 | — |
| Pyroquilon (b) | 150 | 5 | 1 | 4 | 0 | 40.0 | 55.6 | — |
| Tolprocarb (a) + dinotefuran | 90 + 120 | 5 | 4 | 1 | 0 | 10.0 | 88.9 | 77.8 |
| Pyroquilon (b) + thiamethoxam | 150 + 60 | 5 | 4 | 1 | 0 | 10.0 | 88.9 | 75.3 |
| Dinotefuran | 120 | 5 | 1 | 2 | 2 | 60.0 | 33.3 | — |
| Thiamethoxam | 60 | 5 | 1 | 3 | 1 | 50.0 | 44.4 | — |
| Probenazole (h) | 250 | 5 | 3 | 2 | 0 | 20.0 | 77.8 | — |
| No treatment | | 5 | 0 | 1 | 4 | 90.0 | — | — |

From the results in Table 15, the test compounds (a) and (b) exhibited the excellent control effect on cucumber mosaic virus (CMV) by the treatment on 3 day before inoculation. In addition, by mixing and applying the test compound (a) and the dinotefuran (insecticidal component) and the test compound (b) and the thiamethoxam (insecticidal component), the excellent control effect which could not be expected from solo application was exhibited (synergistic effect). In addition, phytotoxicity was not observed in the cucumber (cultivar: Sagami-hanjiro) by the applica- The synergistic effect was calculated from the following Colby's equation.

Synergistic effect (expected value)=(control value of compound A+control value of compound B)− (control value of compound A×control value of compound B)/100

When the control value exceeded the expected value in the case of mixing the compounds and applying the mixed product, it was determined that there was a synergistic effect.

TABLE 16

| Chemical agent | Treatment amount | Number of Checked Plants | Infection index 0 | 1 | 2 | Disease Severity index | Control value | Expected Value |
|---|---|---|---|---|---|---|---|---|
| No treatment | | 4 | 1 | 2 | 1 | 50.0 | — | — |
| Granule containing 1% of dinotefuran | 1 g/pot | 4 | 3 | 1 | 0 | 12.5 | 75.0 | — |
| Granule containing 3% of tolprocarb (a) | 25 mg/pot | 4 | 2 | 2 | 0 | 25.0 | 50.0 | — |
| Granule containing 5% of pyroquilon (b) | 25 mg/pot | 4 | 2 | 2 | 0 | 25.0 | 50.0 | 87.5 |
| Granule containing 1% of dinotefuran + Granule containing 3% of tolprocarb (a) | 1 g/pot + 25 mg/pot | 4 | 4 | 0 | 0 | 0.0 | 100.0 | 87.5 |
| Granules containing 1% of dinotefuran + Granules containing 5% of pyroquilon (b) | 1 g/pot + 25 mg/pot | 4 | 4 | 0 | 0 | 0.0 | 100.0 | — |
| No inoculation and No treatment | | 4 | 4 | 0 | 0 | 0.0 | — | — |

From the results in Table 16, the test compounds (a) and (b) exhibited the excellent control effect on tomato yellow leaf curl disease (TYLCV) by the treatment on 7 day before inoculation. In addition, by mixing the test compound (a) or the test compound (b) with the dinotefuran (insecticidal component) and applying the mixed products, the excellent control effect which cannot be expected from solo application was exhibited (synergistic effect). In addition, phytotoxicity was not observed in the plant tomato (cultivar: Sekai-ichi) by the application of the test compounds (a) and (b), and the dinotefran.

Test Example 17—Control Test on Rice Streak Virus (RSV) (Field Trial of Nursery Box Application)

Rice seedlings (cultivar: Hinohikari) were grown in a greenhouse according to an ordinary procedure and transplanted to an open paddy field. Granules containing 4% of tolprocarb (a) and granules containing 6% of dinotefuran (insecticidal ingredient) formulated according to Formulation Example 2 were respectively treated or were treated in combination in 50 g per box in a nursery box on the day of transplantation. 35 days after transplantation, larvae of RSV-carrying small brown planthopper were released for one week to inoculate rice plants by sucking. At 79 days and 99 days after transplantation, the presence or absence of the unshooting of head was examined.

TABLE 17

| | Unshooting of Head (Presence: +, Absence: −) | |
|---|---|---|
| Chemical agent | After 79 days | After 99 days |
| Granules containing 6% of dinotefuran Granules containing 4% of tolprocarb (a) | − | − |
| Granules containing 6% of dinotefuran | − | + |
| No treatment | + | + |

From the results in Table 17, by mixing and applying the test compound (a) and the dinotefuran (insecticidal component), an excellent control effect on the rice stripe blight (RSV) was observed by nursery box application. In addition, when the dinotefuran (insecticidal component) was applied alone, there was the effect of delaying the occurrence of the unshooting of head, whereas when the test compound (a) was mixed and applied, the effect was to be further enhanced. In addition, phytotoxicity was not observed in the plant rice (cultivar: Hinohikari) by the application of the test compound (a) and the dinotefran.

Test Example 18—Control Test on Chinese Cabbage Soft Rot (Soil Incorporation Test)

Chinese cabbage (cultivar: Muso) planted in a plastic pot having a diameter of 12 cm was grown up to 5-true leaf stage in a greenhouse. Granules containing 3% of tolprocarb (a) (trade name; Sanblas (registered trademark) granules (manufactured by Mitsui Chemical Agro Co., Ltd.)), granules containing 5% of pyroquilon (b) (trade name; Coratop (registered trademark) granules (manufactured by Mitsui Chemical Agro Co., Ltd.)), granules containing 1.5% of simeconazole (fungicidal component) (trade name; Mongalite (registered trademark) granules (manufactured by Mitsui Chemical Agro Co., Ltd.)) and flowable containing 20% of penthiopyrad (fungicidal component) were respectively incorporated or were incorporated in combination into a pot soil in a predetermined amount. Then, the Chinese cabbage was planted in the pot soil. At 14 days after chemical agent treatment, the Chinese cabbage soft rot was inoculated. The inoculation method was as follows; the plants were inoculated by stabbing the leaves with pins dipped in a suspension of Chinese cabbage soft rot bacteria (*Erwinia carotovora* subsp. *carotovora*). Thereafter, the inoculated plantes were put in a 25° C. greenhouse to promote infection for 2 days, and the control effect was examined. The infection was examined by the degree of infection, and the disease severity index was calculated based on the degree of infection. The control value was calculated from the disease severity index. The results were shown in Table 18.
Infection Index
0: no infection (lesion area rate of 0%)
1: infection was observed only around the inoculation position but was not progressed.
2: lesion progressed around the inoculation position was observed.

3: lesion progressed around the inoculation position was observed and was further spread through the vascular bundle.

Severity index=((the number of leaves of infection index 0×0)+(the number of leaves of infection index 1×1)+(the number of leaves of infection index 2×2)+(the number of leaves of infection index 3×3)/(the number of leaves examined×3)×100

The control value was calculated from the following equation.

Control value=(1−degree of infection of treated plot/degree of infection of untreated plot)×100

The synergistic effect was calculated from the following Colby's equation.

Synergistic effect (expected value)=(control value of compound $A$+control value of compound $B$)−(control value of compound $A$×control value of compound $B$)/100

When the control value exceeded the expected value in the case of mixing the compounds and applying the mixed product, it was determined that there was a synergistic effect.

diseases caused by fungi such as tomato powdery mildew, cucumber powdery mildew and cucumber downy mildew; and diseases caused by virus such as cucumber mosaic virus (CMV), tomato yellow leaf curl virus (TYLCV) and rice streak virus (RSV); and the like, the excellent control effect, which cannot be expected from the typical use method, is exhibited and the high control effect on the plant diseases is exhibited. In addition, the high control effect is exhibited by using not only the active ingredient alone but also a mixture with other agricultural chemical active ingredients, and agricultural chemical formulations containing the active ingredient alone or agricultural chemical formulations formulated by mixing with other agricultural chemical active ingredients exhibits the high plant disease control effect. In addition, since phytotoxicity is not observed in plants, it can be used as an excellent composition for controlling plant diseases.

This application claims priority based on Japanese Patent Application No. 2017-036468 filed on Feb. 28, 2017, the entire disclosure of which is incorporated herein.

TABLE 18

| Chemical agent | Treatment amount | Number of Checked Leaves | Infection Index according to Degree | | | | Disease Severity index | Control value | Expected Value |
|---|---|---|---|---|---|---|---|---|---|
| | | | 0 | 1 | 2 | 3 | | | |
| No treatment | | 12 | 0 | 1 | 6 | 5 | 77.78 | — | — |
| Granules containing 3% of tolprocarb (a) | 1.5 kg/10a | 6 | 1 | 5 | 0 | 0 | 27.78 | 64.3 | — |
| Granules containing 5% of pyroquilon (b) | 1.5 kg/10a | 6 | 2 | 4 | 0 | 0 | 22.22 | 71.4 | — |
| Granules containing 1.5% of simeconazole | 6 kg/10a | 6 | 0 | 2 | 4 | 0 | 55.56 | 28.6 | — |
| Flowable containing 20% of penthiopyrad | ×2000 dilution, 1 L/m² | 6 | 0 | 2 | 4 | 0 | 55.56 | 28.6 | — |
| Granules containing 3% of tolprocarb (a) + Granules containing 1.5% of simeconazole | 1.5 kg/10a 6 kg/10a | 6 | 3 | 3 | 0 | 0 | 16.67 | 78.6 | 74.5 |
| Granules containing 3% of tolprocarb (a) + Flowable containing 20% of penthiopyrad | 1.5 kg/10a ×2000 dilution, 1 L/m² | 6 | 4 | 1 | 1 | 0 | 16.67 | 78.6 | 74.5 |
| Granules containing 5% of pyroquilon (b) + Granules containing 1.5% of simeconazole | 1.5 kg/10a 6 kg/10a | 6 | 5 | 0 | 1 | 0 | 11.11 | 85.7 | 79.6 |
| Granules containing 5% of pyroquilon (b) + Flowable containing 20% of penthiopyrade | 1.5 kg/10a ×2000 dilution, 1 L/m² | 6 | 6 | 0 | 0 | 0 | 0.00 | 100.0 | 79.6 |

From the results in Table 18, the test compounds (a) and (b) exhibited the excellent control effect on the Chinese cabbage soft rot by the whole soil incorporation at the time of planting. In addition, by mixing and applying the test compound (a) or the test compound (b) with the dinotefuran (fungicidal component) or penthiopyrad (fungicidal component), the excellent control effect which could not be expected from solo application was exhibited (synergistic effect). In addition, phytotoxicity was not observed in the Chinese cabbage plant (cultivar: Muso) by the application of the test compounds (a) and (b), and the simeconazole and the penthiopyrad.

INDUSTRIAL APPLICABILITY

The composition for controlling plant diseases of the present invention contains a melanin biosynthesis inhibitor which is tolprocarb (compound a), pyroquilon (compound b), tricyclazole (compound c) or fthalide (compound d) as active ingredients. By using the composition of the present invention for plant diseases which are, for example, diseases caused by bacteria such as bacterial leaf blight of rice, rice bacterial palea browning, Chinese cabbage soft rot, cucumber leaf spot bacterial diseases, and cabbage black rot;

The invention claimed is:

1. A composition for controlling plant diseases comprising at least one selected from the group consisting of tolprocarb, pyroquilon, tricyclazole, fthalide and salts thereof as a sole active ingredient, which is used to control at least one plant disease selected from the group consisting of fungal diseases other than rice blast, bacterial diseases other than bacterial grain rot of rice and viral diseases.

2. The composition according to claim 1,
wherein the sole active ingredient is tolprocarb or salts thereof.

3. The composition according to claim 1,
wherein the sole active ingredient is at least one selected from the group consisting of pyroquilon, tricyclazole, fthalide and salts thereof, and
the plant disease is at least one selected from the group consisting of fungal disease other than rice blast and anthracnose and bacterial diseases other than bacterial grain rot of rice and viral diseases.

4. The composition according to claim 1,
wherein the plant disease is at least one selected from the group consisting of fungal disease, bacterial diseases and viral diseases of horticultural crops.

5. The composition according to claim 1,
wherein the plant disease is at least one selected from the group consisting of fungal diseases, bacterial diseases and viral diseases of the horticultural crops other than anthracnose.

6. The composition according to claim 1,
wherein the bacterial diseases is bacterial leaf blight of rice and/or rice bacterial palea browning.

7. The composition according to claim 1,
wherein the plant disease is at least one selected from the group consisting of diseases caused by at least one bacteria selected from the group consisting of *Xanthomonas, Pseudomonas* and *Envinia;* diseases caused by at least one fungus selected from the group consisting of powdery mildew and downy mildew; and diseases caused by at least one virus selected from the group consisting of cucumber mosaic virus (CMV), tomato yellow leaf curl virus (TYLCV) and rice stripe virus (RSV).

8. A method for use of a composition comprising at least one selected from the group consisting of tolprocarb, pyroquilon, tricyclazole, fthalide and salts thereof as a sole active ingredient to control at least one plant disease selected from the group consisting of fungal diseases other than rice blast, bacterial diseases other than bacterial grain rot of rice and viral diseases.

9. The method according to claim 8,
wherein the sole active ingredient is tolprocarb or salts thereof.

10. The method according to claim 8,
wherein the sole active ingredient is at least one selected from the group consisting of the pyroquilon, tricyclazole, fthalide and salts thereof, and
the plant disease is selected from the group consisting of fungal diseases other than rice blast and anthracnose, bacterial diseases other than bacterial grain rot of rice and viral diseases.

11. The method according to claim 8, wherein the plant disease is at least one selected from the group consisting of fungal diseases, bacterial diseases and viral diseases of horticultural crops.

12. The method according to claim 8, wherein the plant disease is at least one selected from the group consisting of fungal diseases, bacterial diseases and viral diseases of the horticultural crops other than anthracnose.

13. The method according to claim 8,
wherein the bacterial diseases are bacterial leaf blight of rice and/or rice bacterial palea browning.

14. The method according to claim 8,
wherein the plant disease is at least one selected from the group consisting of diseases caused by at least one bacteria selected from the group consisting of *Xanthomonas, Pseudomonas* and *Envinia;* diseases caused by at least one fungus selected from the group consisting of powdery mildew and downy mildew; and diseases caused by at least one virus selected from the group consisting of cucumber mosaic virus (CMV), tomato yellow leaf curl virus (TYLCV) and rice stripe virus (RSV).

15. The method according to claim 8,
wherein the use of the composition is treatment for plants or soil.

16. The method according to claim 15,
wherein the treatment for soil is one selected from soil drench, mixing with soil and/or treatment to soil surface before planting, at planting or after planting.

17. The method according to claim 15,
wherein the application method is spraying to plants.

18. The method according to claim 15,
wherein the application method is treatment to seeds.

* * * * *